July 11, 1933.  J. F. PETERS  1,917,270
MACHINE FOR FORMING METAL BANDS
Filed Sept. 27, 1930   13 Sheets-Sheet 1

INVENTOR
John F. Peters
BY
John C. Carpenter
ATTORNEY

July 11, 1933.  J. F. PETERS  1,917,270
MACHINE FOR FORMING METAL BANDS
Filed Sept. 27, 1930   13 Sheets-Sheet 2

INVENTOR
John F. Peters
BY
John C. Carpenter
ATTORNEY

July 11, 1933. J. F. PETERS 1,917,270
MACHINE FOR FORMING METAL BANDS
Filed Sept. 27, 1930 13 Sheets-Sheet 3

INVENTOR
John F. Peters
BY
John C. Carpenter
ATTORNEY

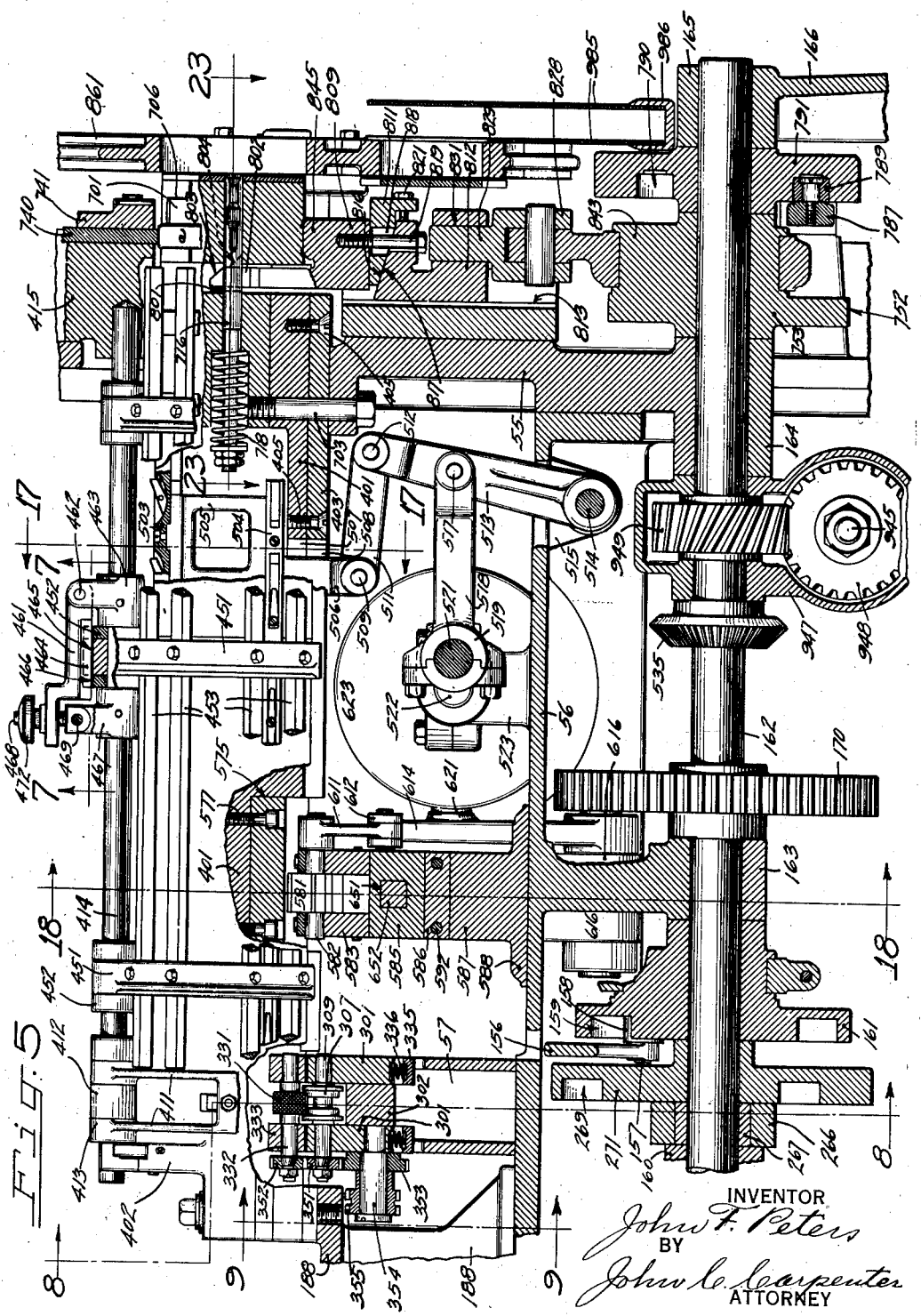

July 11, 1933.  J. F. PETERS  1,917,270
MACHINE FOR FORMING METAL BANDS
Filed Sept. 27, 1930   13 Sheets-Sheet 5
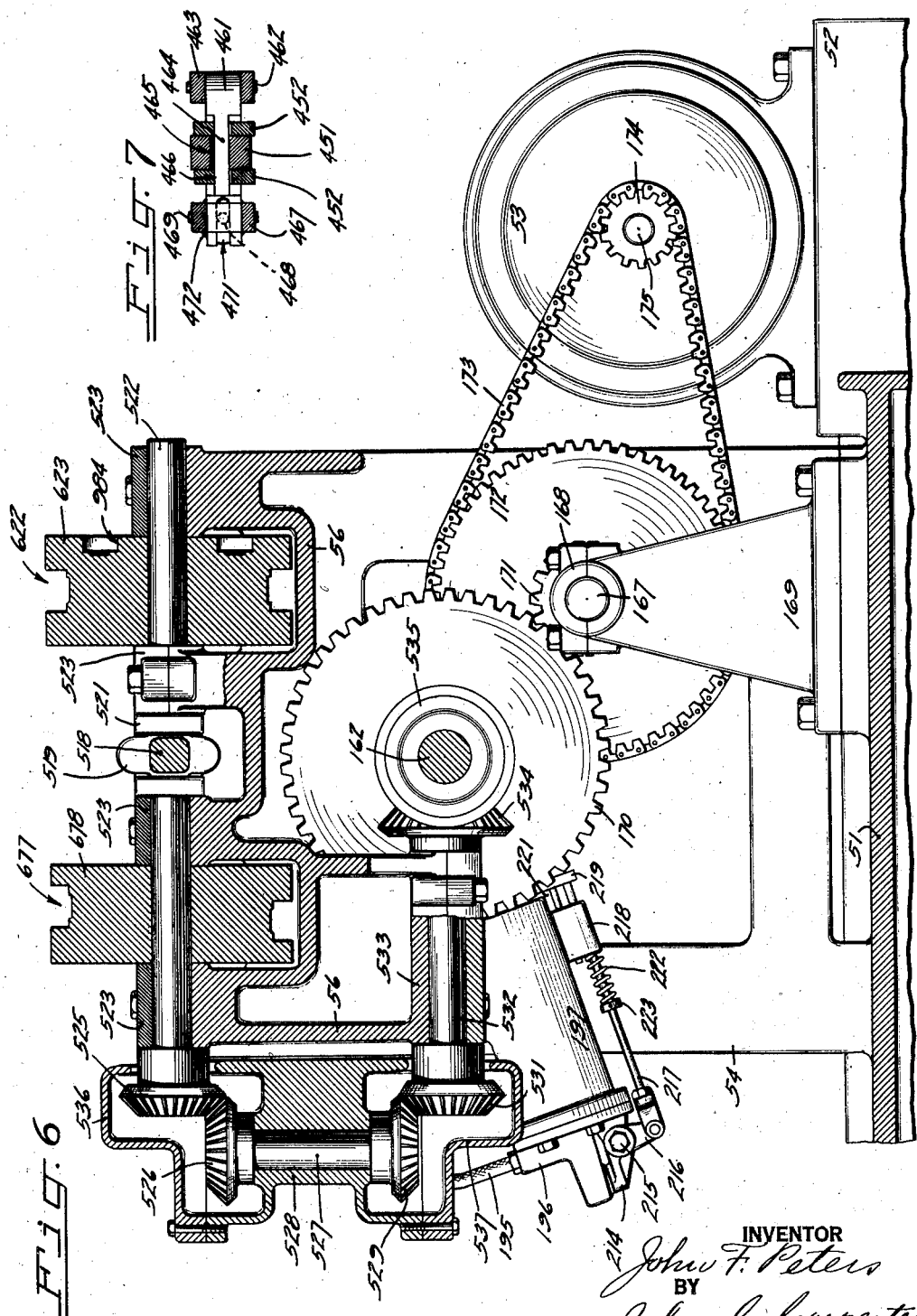
INVENTOR
John F. Peters
BY
John C. Carpenter
ATTORNEY

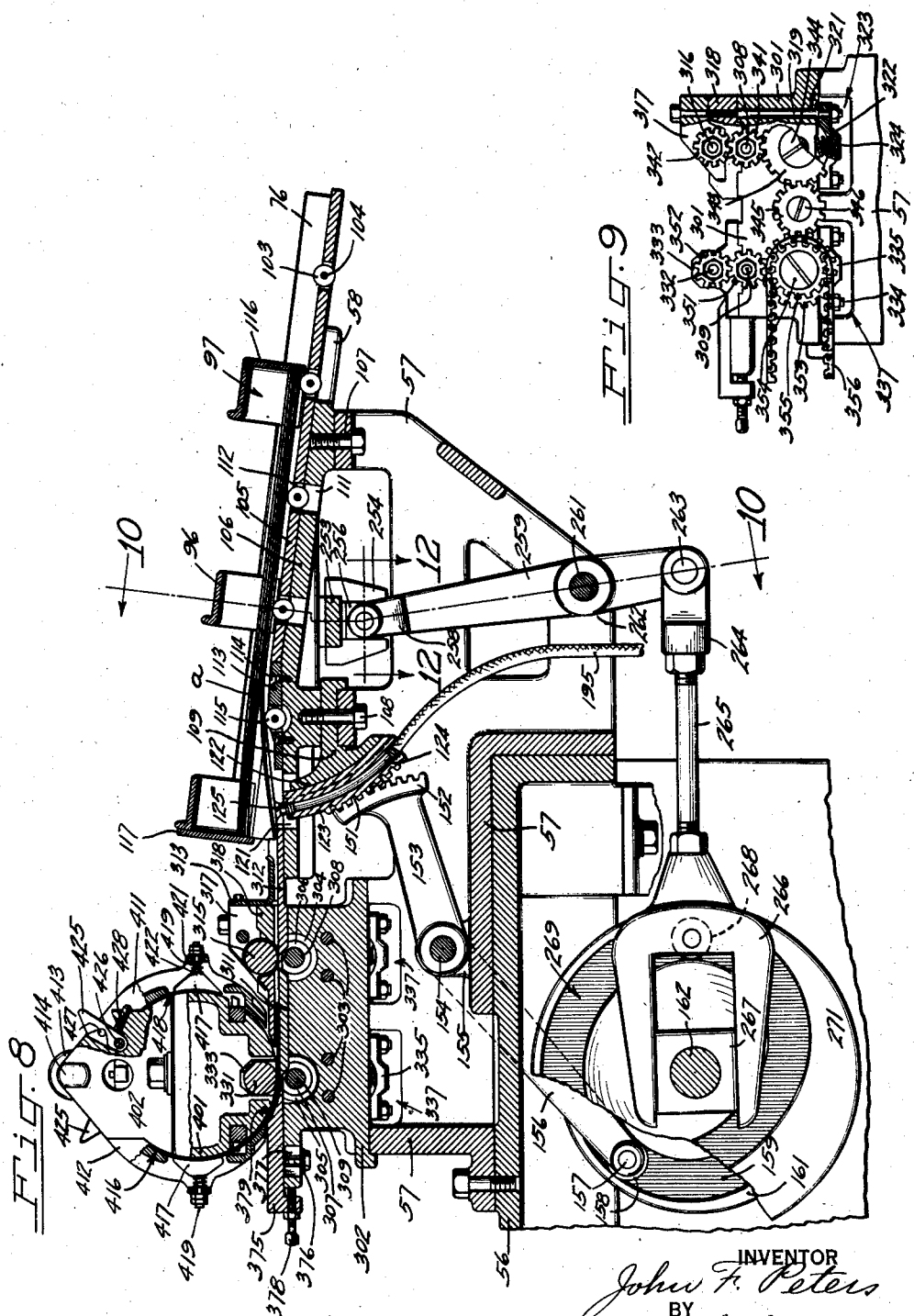

July 11, 1933.   J. F. PETERS   1,917,270
MACHINE FOR FORMING METAL BANDS
Filed Sept. 27, 1930    13 Sheets-Sheet 7
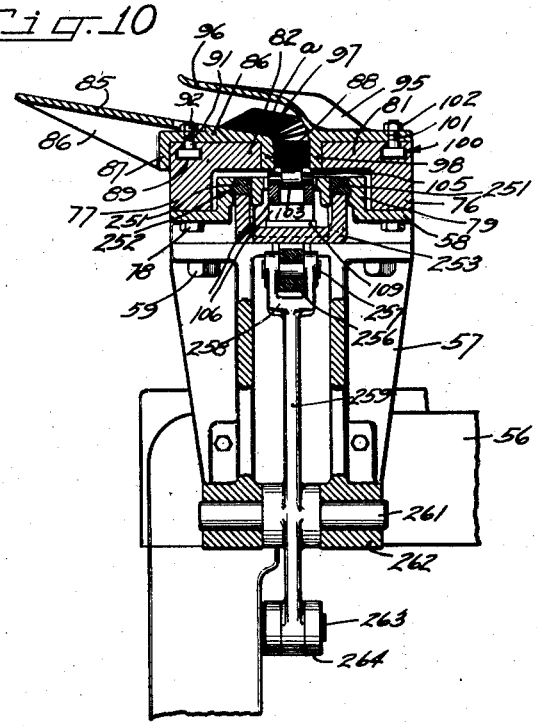
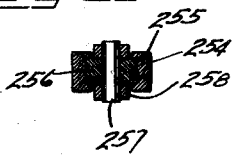
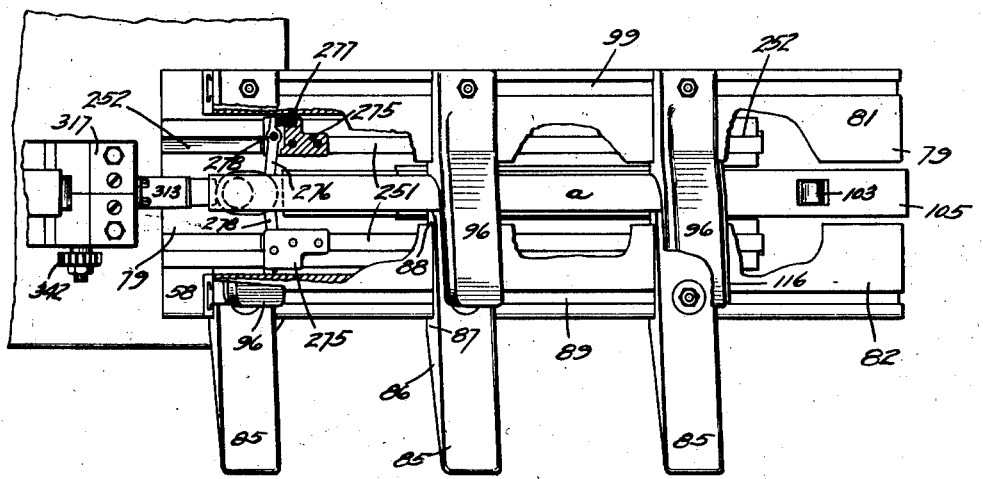

July 11, 1933.  J. F. PETERS  1,917,270
MACHINE FOR FORMING METAL BANDS
Filed Sept. 27, 1930  13 Sheets-Sheet 8
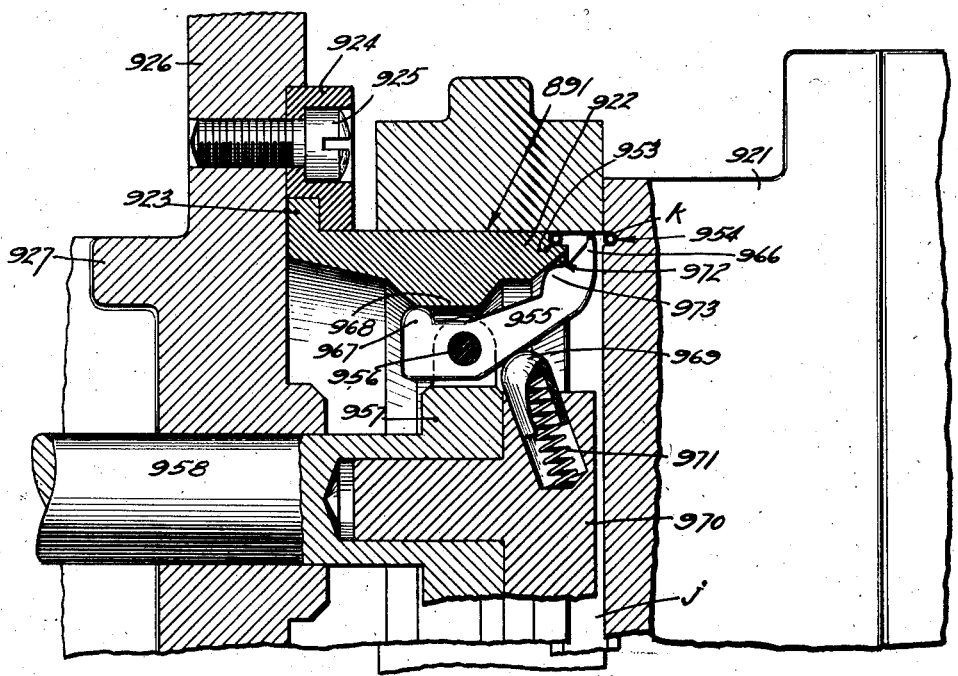
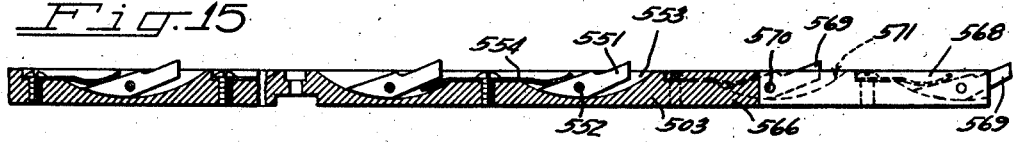
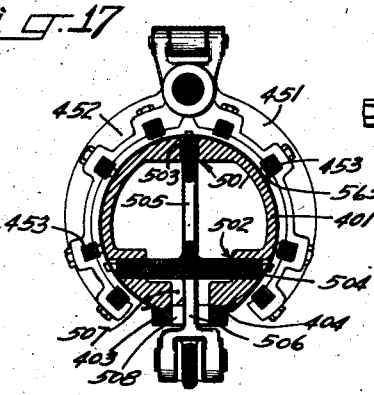
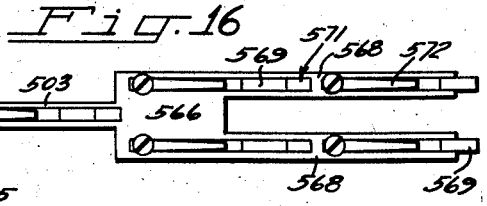

July 11, 1933.  J. F. PETERS  1,917,270
MACHINE FOR FORMING METAL BANDS
Filed Sept. 27, 1930   13 Sheets-Sheet 9
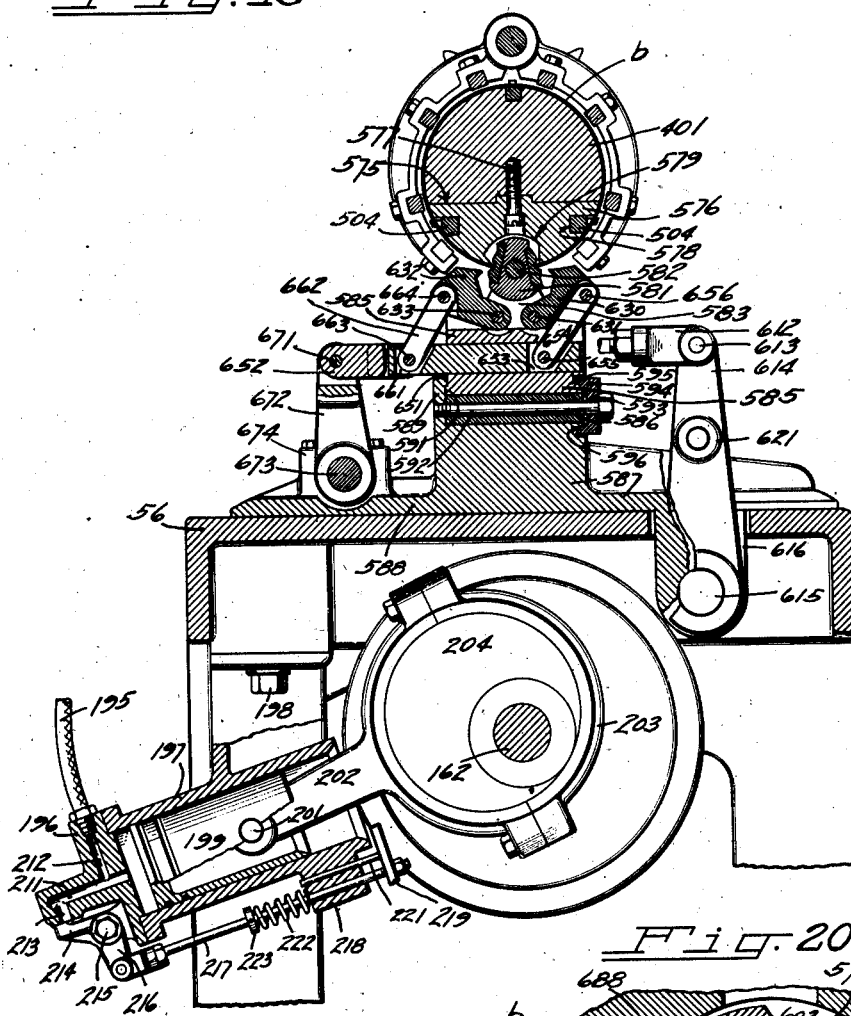
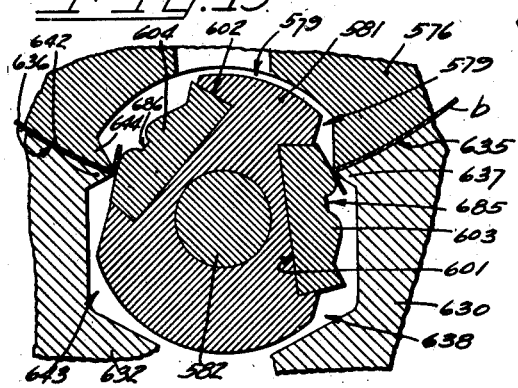
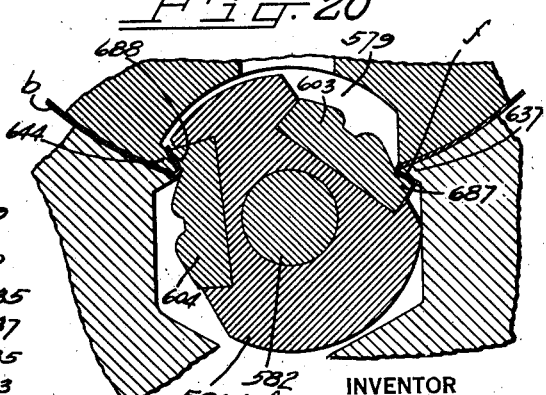
INVENTOR
John F. Peters
BY
John C. Carpenter
ATTORNEY July 11, 1933.  J. F. PETERS  1,917,270
MACHINE FOR FORMING METAL BANDS
Filed Sept. 27, 1930   13 Sheets-Sheet 10

INVENTOR
John F. Peters
BY
John C. Carpenter
ATTORNEY

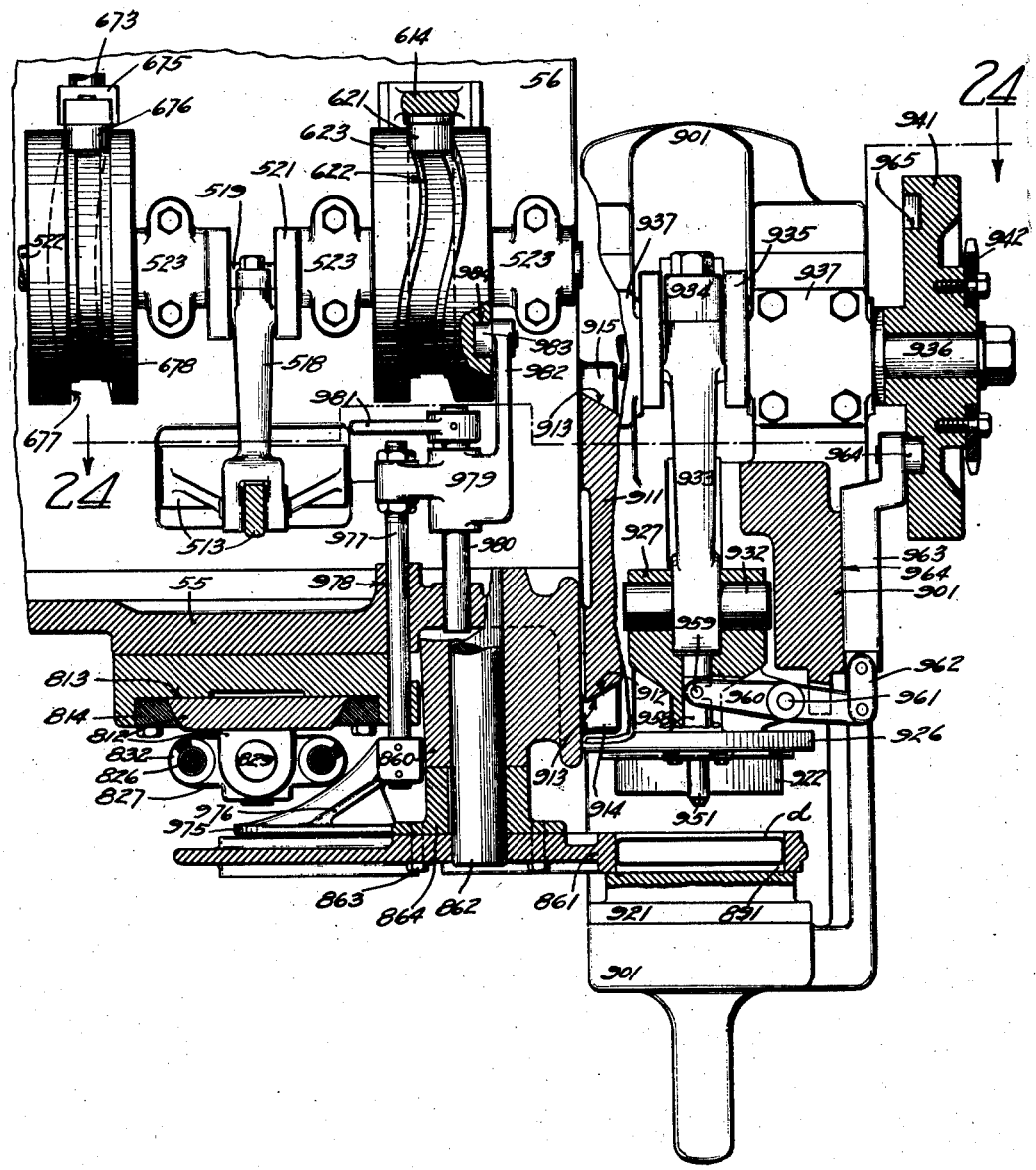

July 11, 1933.   J. F. PETERS   1,917,270
MACHINE FOR FORMING METAL BANDS
Filed Sept. 27, 1930   13 Sheets-Sheet 12
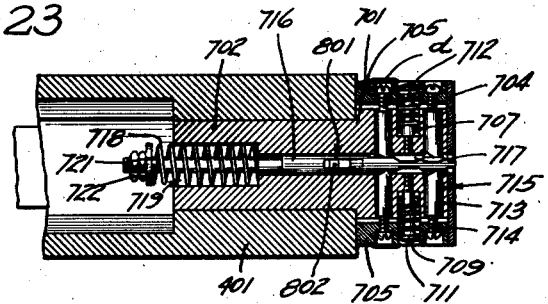
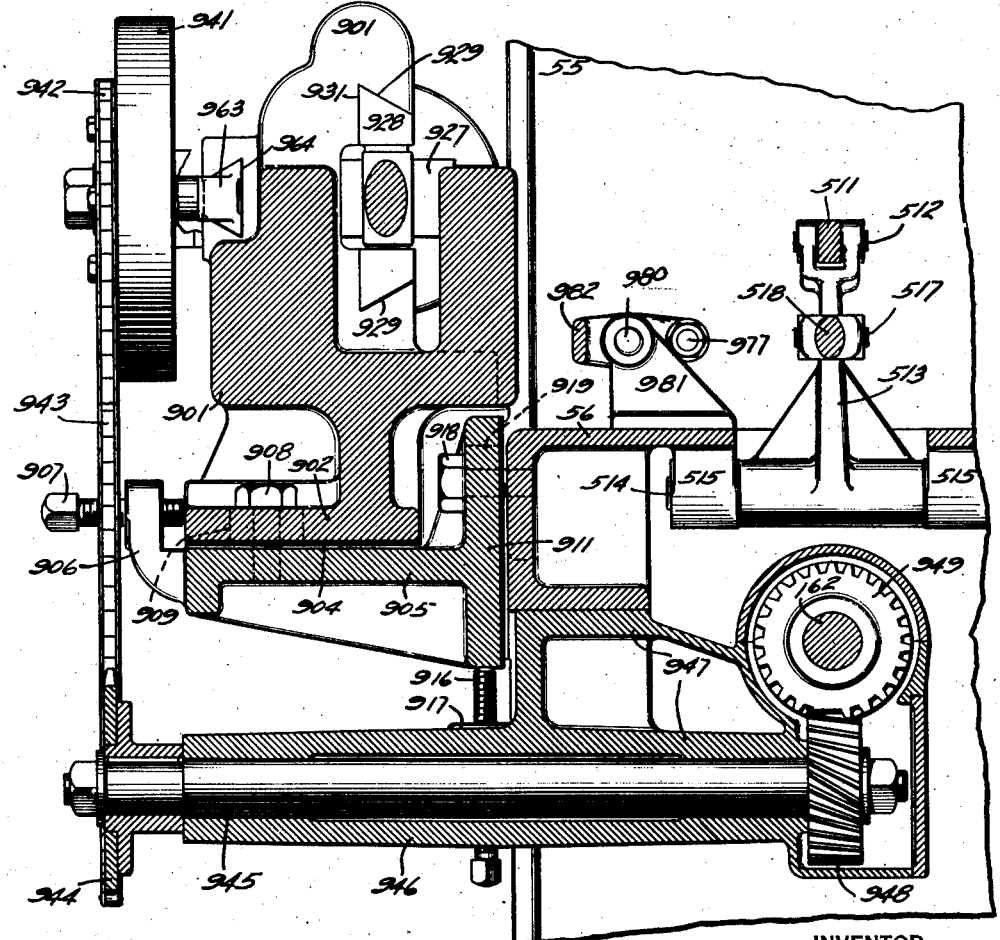

July 11, 1933.  J. F. PETERS  1,917,270
MACHINE FOR FORMING METAL BANDS
Filed Sept. 27, 1930   13 Sheets-Sheet 13
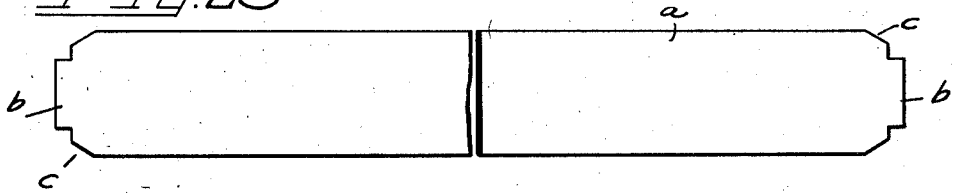
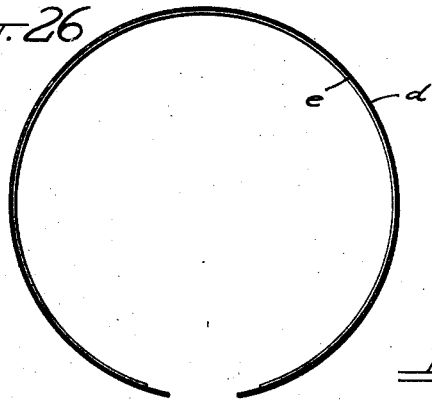
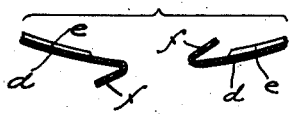
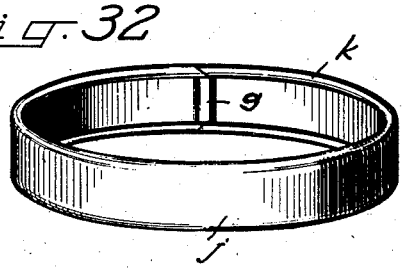
INVENTOR
John F. Peters
BY
John C. Carpenter
ATTORNEY Patented July 11, 1933

1,917,270

UNITED STATES PATENT OFFICE

JOHN F. PETERS, OF LEONIA, NEW JERSEY, ASSIGNOR TO AMERICAN CAN COMPANY, OF NEW YORK, N. Y., A CORPORATION OF NEW JERSEY

MACHINE FOR FORMING METAL BANDS

Application filed September 27, 1930. Serial No. 484,862.

The present invention relates to a machine for forming metal bands and particularly bands which are adapted for insertion into the body of a can to form an interior collar on which a severed upper portion of the body may be positioned as a temporary closure after being separated by removal of a tearing strip or in other manner.

The preferred form of machine illustrating an embodiment of the present invention is similar, in some respects, to the machine described in my pending application, Serial No. 331,664, filed in the United States Patent Office January 10, 1929, now Patent No. 1,773,856, dated August 26, 1930 but differs in important particulars, the machine of the present invention producing a collar band of different construction and one of great rigidity and strength.

The principal object of the present invention is the provision of an organized apparatus for forming a collar band from a flat metal strip by securely fastening the ends of the formed band in a rigid lock seam joint, the side edges of the band being curled to provide the finished collar band.

Another important object of the invention is the provision of an improved apparatus for automatically feeding cut metal strips from a stack or magazine and shaping and otherwise treating the same to produce closed reinforced collar bands for the purpose specified.

An important object of the invention is the provision of an apparatus for feeding a flat strip from a magazine and forming it into circular shape, then edging the ends of the strip to form interlocking ends which are subsequently united into a continuous annulus, the edges being curled to produce a completed collar band.

Numerous other objects of the invention will be apparent as it is better understood from the following description, which, taken in connection with the accompanying drawings, discloses a preferred embodiment thereof.

Referring to the drawings:

Fig. 5 is a transverse sectional view through the forming mandrel being taken substantially along the line 5—5 in Fig. 1, parts being shown in full and parts broken away;

Fig. 6 is a transverse sectional view taken substantially along the line 6—6 in Fig. 1;

Fig. 7 is a bottom sectional detail taken along the line 7—7 in Fig. 5;

Fig. 8 is a transverse sectional view taken through the strip magazine and substantially along the line 8—8 in Fig. 5;

Fig. 9 is a sectional detail taken along the line 9—9 in Fig. 5;

Fig. 10 is a transverse sectional view taken substantially along the line 10—10 in Fig. 8;

Fig. 11 is a fragmentary plan view of that part of the mechanism disclosed in Fig. 10;

Fig. 12 is a sectional detail taken along the line 12—12 in Fig. 8;

Fig. 13 is an enlarged sectional view of the die parts used for curling the edges of the closed annulus;

Fig. 14 is a transverse sectional detail of one of the side feeding bars;

Fig. 15 is a sectional detail similar to Fig. 14, illustrating the top feeding bar;

Fig. 16 is a plan view of the front end of the feed bar illustrated in Fig. 15;

Fig. 17 is a transverse sectional detail taken along the line 17—17 in Fig. 5;

Fig. 18 is a transverse sectional view taken along the line 18—18 in Fig. 5 illustrating the edging mechanism;

Fig. 19 is an enlarged sectional detail of a part of the edging mechanism disclosed in Fig. 18 illustrating these parts in initial edging position;

Fig. 20 is a view similar to Fig. 19 illustrating the position of the parts at the completion of the edging operation;

Fig. 22 is a sectional plan view taken substantially along the broken line 22—22 in Fig. 21;

Fig. 23 is a plan sectional view taken substantially along the line 23—23 in Fig. 5;

Fig. 24 is a longitudinal section taken substantially along the broken line 24—24 in Fig. 22;

Fig. 25 is a plan view of the collar band strip as it appears when received into the machine, part of its center being broken away;

Fig. 26 is a sectional view of the partly formed strip;

Fig. 27 is a perspective view of a fragment of a partly formed strip;

Fig. 28 is a fragmentary sectional view of the hooked or edged ends of the same;

Fig. 29 is a view similar to Fig. 28 showing these hooked ends interconnected;

Fig. 30 is a view similar to Fig. 29 illustrating the ends secured together in a lock seam;

Fig. 31 is a perspective view of a fragment of the band illustrating its curled edges in section; and Fig. 32 is a perspective view of the finished collar band.

Figure 1:
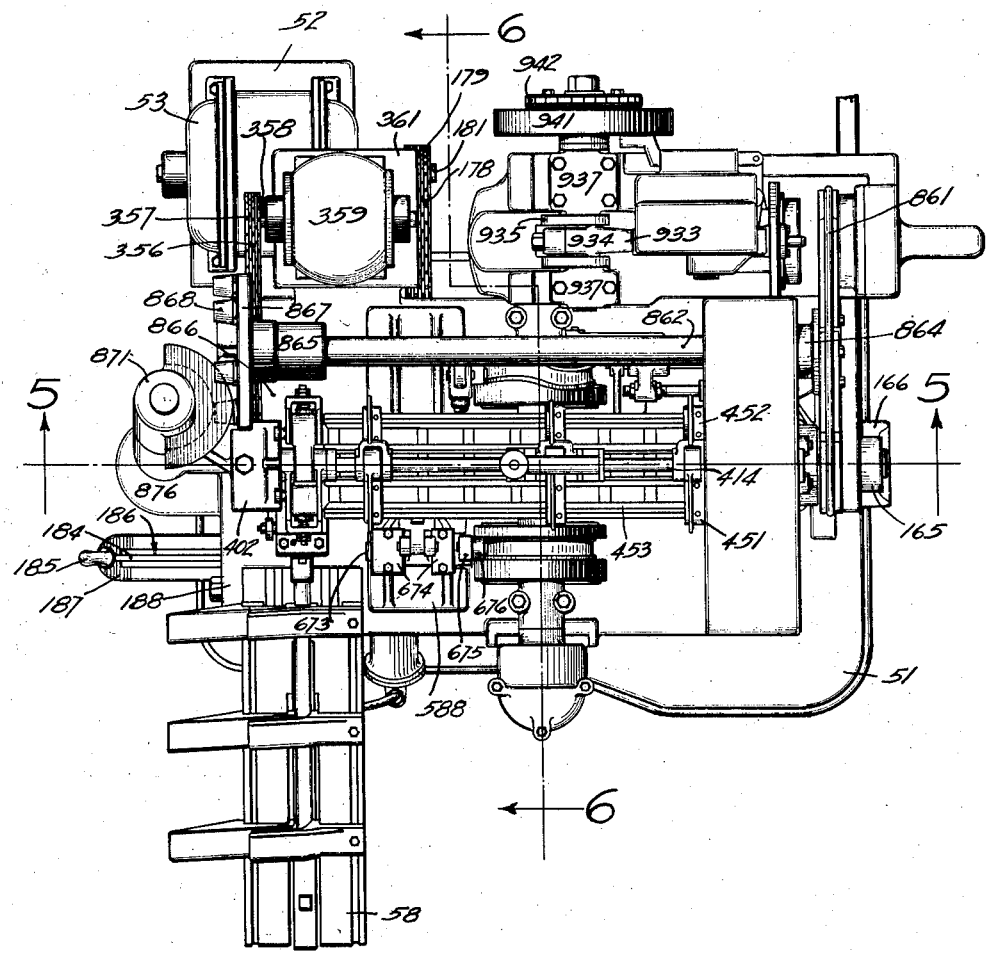
Figure 1 is a plan view of the improved collar band forming and curling machine.

The principal working parts of the machine, are mounted on suitable frame supports and are operated in synchronism by connection with a drive shaft herein illustrated as receiving rotative power by direct connection with an electric motor. Forming rollers of the apparatus are driven at a high speed by an independent motor and the strips of sheet material properly cut to size and shape (as shown in Fig. 25) are individually fed from a magazine in the machine. Each individual strip, as removed from the bottom of the stack of strips, is introduced into the bite of the forming rollers which cooperate with a deflecting plate to feed and bend the strip into circular form while preferably flanging its edges (Figs. 26 and 27), this operation positioning the formed annulus upon a horizontal forming mandrel.

Intermittently operating feeding devices advance the annulus along the mandrel through a series of operating stations. At the first of these stations, the ends thereof are edged (Fig. 28) by being bent into hook form. Subsequent feeding steps carry the annulus along the mandrel and through a series of idle stations, the annulus then coming to rest on an auxiliary horn or mandrel secured to the front end of the forming mandrel. It is on this auxiliary mandrel that the hooked edges are interlocked (Fig. 29) and bumped and closed to form a completed lock seam (Fig. 30).

The closed annulus is then removed from the auxiliary horn (which at such time is collapsed) and is positioned into one of a series of pockets of an intermittently movable turret which transfers it to a curling station and between a pair of oppositely disposed curling dies which engage the flanged edges of the collar band and curl them to produce the finished collar band which has a cross section illustrated in Fig. 31. After being further advanced by the turret to a position beyond the curling station, the finished collar band (Fig. 32) is discharged from its pocket into a chute and rolls out of the machine.

This machine is well adapted to form perfect edge curls in bands the ends of which are not merely lapped and the edge portions of which have only a single thickness of metal.

In the present description, the cut metal strips of which the collar bands are formed by the apparatus will be designated by the letter $a$ (Fig. 25) the ends of which project at $b$ and have clipped corners $c$. After these strips are formed into circular shape the annulus (Fig. 26) with separated ends will be referred to by the letter $d$, this annulus having slightly curled or flanged edges $e$ (see also Fig. 27). Letter $f$ (Figs. 28 and 29) designates the hooked edges formed on the ends of the band $d$. These hooked edges $f$ of the annulus $d$ are interlocked and tightly pressed together, the resulting seam (Fig. 30) being designated by the letter $g$. This annulus then has its side edges rolled or curled at $h$ (Fig. 31) which completes the formation of the collar band designated by the letter $j$, this being the finished product produced by the machine of the present invention.

*Supporting frame structure*

The operating and supporting parts of the machine are carried on a base 51 (Figs. 1, 2, 3 and 4), an auxiliary motor base 52 being mounted adjacent and supporting the principal driving power element, illustrated as an electric motor 53. A supporting leg 54, carried on the base 51, cooperates with an upwardly extending arch frame 55 to support a bed or table 56. This frame 55 is also carried on the base.

The principal driving mechanism is mounted beneath the table 56 and the station operating devices are for the most part mounted above the table. A bracket or intermediate frame 57 (Figs. 1, 2, 3 and 8) is supported by the table 56 at the rear end of the machine and carries a strip magazine supporting frame 58 secured to the frame 57 by bolts 59 and on this frame the strip magazine and feed mechanism associated therewith are mounted. This part of the machine will now be described.

*Strip magazine end feed*

The strips $a$ are stacked one above the other and placed in a magazine which comprises a pair of spaced angle frames 76 and 77 (Figs. 2, 8 and 10) secured by bolts 78 to the frame 58. A raised central part 79 of the frame 58 is located between the spaced frames 76 and 77 and beneath horizontal over-hanging sections 81 and 82 of the respective frames. The strips *a* in the stack move under the influence of gravity over inclined floors 85 of spaced bracket members 86 positioned on the frame part 82.

Each member 86 is provided with spaced downwardly extending projections 87 and 88 (see also Fig. 11) which engage opposite side walls of the part 82. The frame part 82 is provided with a longitudinally extending T-slot 89 cut along its upper face in which is located the heads of a number of bolts 91, there being a bolt for each member 86. By means of this construction the members 86 may be individually moved lengthwise of the frame 82, the bolts 91 moving along the T-slot 89. A locknut 92 is threadedly secured to each bolt 91 and provides locking means for holding its member 86, after it has been brought into the desired adjusted position, relative to the frame 82.

Three members 86 are shown in the drawings, the number depending upon the length of the strip *a* in use, the position of the members on the frame being controlled by the amount of support necessary for the stack of strips. Each member 86 is associated with a similar member 95 having an overhanging wall 96 spaced from the horizontal floor 85 of the member 86, the two parts 85 and 96 providing an inclined passageway 97 along which the stack of blanks move.

Each member 95 is provided with a downwardly projecting wall 98 which engages the inner side wall of the frame part 81 and the spaced inner walls of the projections 88 and 98 form continuations or extensions to the passageways 97.

Each of the members 95 may be moved to properly cooperate with its associated member 86 and for this purpose the frame 81 is provided with a longitudinally extending T-slot 100 in which is located the heads of bolts 101, there being one bolt for each member 95. Threadedly engaging each bolt is a locknut 102 which provides a means for locking the members 95 in proper adjusted position relative to the frame part 81. The stack of strips *a*, moving by gravity along the passageways 97 thus come into vertical stacked formation between the walls of the parts 88 and 98 as illustrated in Fig. 10.

A series of anti-frictional rollers 103 (Figs. 8, 10 and 11) are loosely mounted to turn on horizontal shafts 104 journaled in bearings formed in a central strip 105 mounted upon and secured to a plate 106 in its turn secured by a bolt 107 to the outer end of the bracket 57 and by a bolt 108 passing through a block 109 and connected with the inner part of the bracket 57. The plate 106 is provided with slots 111 and the plate 105 with corresponding slots 112 to allow for clearance and free rotation of the rollers 103.

The upper faces of the rollers 103 extend above the upper surface of the plate 105 and the stack of blanks *a*, resting between the walls 88 and 98 and within the end of the passageway 97, lay upon the rollers. A forward block 113 (Fig. 8) is secured by screws 114 to the upper surface of the plate 106 and its upper face forms a continuation of the upper face of the plate 105. Block 113 carries the foremost of the anti-frictional rollers, there being provided for this purpose a roller 115 of the same construction as the other rollers.

A plate 116 (Figs. 8 and 11) extends between the rear edges of the outer members 86 and 95 and this forms an end stop for the stack of blanks resting in the magazine. A similar plate 117 is secured to the inner edges of the inner set of members 86 and 95 and constitutes a stop wall for the opposite end of the stack of strips.

The plate 106 is slotted at 121, at a point directly beneath the inner or front end of the stack of blanks, and the block 109 projects upwardly therein. This block 109 is formed with an arcuate groove or slideway 122 in which moves an arcuate segmental slide 123 having a central passageway 124, these parts constituting elements of a suction device. The upper end of the slide carries a suction cup 125, the interior of which communicates with the passageway 124. The slide 123 is adapted to move up and down within its groove 122 and its upward stroke brings the suction cup 125 into engagement with the forward end of the lowermost strip *a* within the magazine. To effect this up and down movement, there is provided a mechanism which will now be described.

The outer arcuate face of the segmental slide 123 (Fig. 8) is formed with rack teeth 151 which mesh with a rack segment 152 formed on the outer end of an arm 153 secured to a rockshaft 154 journaled in a bearing 155 formed in the bracket 57. The shaft 154 also carries an arm 156 (see also Fig. 5), the lower end of which carries a pin 157 on which is rotatably mounted a roller 158 operating in a groove 159 of a cam 161 secured to a horizontal shaft 162 journaled in a bearing 160 (Fig. 3) formed in the leg 54, in a bearing 163 projecting downwardly from the table 56, in a bearing 164 formed in the arch frame 55 and in a bearing 165 formed on the upper end of a bracket 166 (see also Figs. 1 and 21) mounted on one end of the base 51.

The shaft 162 is continually rotated by connection with a drive shaft 167 (Figs. 3 and 6) journaled in bearings 168 formed in a frame 169 resting upon and bolted to the base 51. For this purpose, the shaft 162 carries a gear 170 which meshes with a pinion 171 mounted on the drive shaft 167. The drive shaft 167 carries a sprocket 172 over which operates a chain 173 which also passes over a sprocket 174 secured to a shaft 176 of the motor 53.

The motor 53 is continually rotated and by means of the chain connection just described the sprocket 172 also rotates therewith. This sprocket 172 is loose on the shaft 167 and a clutch 176 (Figs. 2 and 3) of any suitable construction is interposed between the sprocket 172 and the shaft 167 and is operated into clutched or unclutched position by a control lever 177 mounted for oscillation on a shaft 178 carried in a bearing formed in the frame 169.

The lever 177 is connected by a link 179 to an arm 181 carried by a rockshaft 182 mounted for oscillation in a bearing 183 projecting from the frame 54. The shaft 182 is rocked, to operate the clutch 176, by a handle lever 184 secured thereto. This lever is provided with a hand grip 185 and moves within a slot 186 (Fig. 1) formed in a curved bracket 187 secured to a bracket frame 188 carried by the table 56.

As the segmental member 123 is raised by the cam 161 and the connections just described, the suction cup 125 engages the lowermost strip a. At that time the suction cup and the passageway 124 are under a vacuous condition so that the strip will adhere to the suction cup. Then as the suction cup moves downwardly the inner end of the lowermost strip is separated from the other strips in the stack and this end is brought into the position illustrated in Fig. 8.

A self-contained vacuum pump constitutes a part of the present apparatus and provides the necessary suction in the passageway 124 at the proper time. The lower end of the passageway 124 is connected by a flexible hose 195 (Figs. 6, 8 and 18), the lower end of which connects with a cylinder head 196 which closes one end of a cylinder 197 bolted at 198 against the under surface of the table 56. A piston 199 operates within the cylinder 197 and is pivotally connected to a wrist pin 201 carried by an arm 202 of an eccentric strap 203 operating over an eccentric 204 secured to the shaft 162.

A passageway 211 extends into the head 196 from the cylinder 197 and this passageway is also connected by means of a lateral bore 212 with the interior of the hose 195. Constant reciprocation of the piston 199 within its cylinder 197 causes periodic suction impulses at the suction cup 125. This piston movement is properly timed with the raising and lowering of the suction cup 125 so that separation of the end of the lowermost strip is properly controlled.

Passageway 211 also connects with a passageway 213 which forms communication with the outside atmosphere when the end of such passageway 213 is unobstructed. This passageway 213 is closed by means of a valve 214 pivoted at 215 to the cylinder head 196. The valve 214 carries an arm 216 which is pivotally connected to a rod 217 sliding through a boss 218 formed on the cylinder 197. The forward end of the rod 217 carries a plate 219 which in turn carries a guiding pin 221 sliding within the boss 218.

This construction permits lateral shifting of the plate 219 and prevents rotation of the rod 217. The free end of the plate 219 projects within the path of travel of the piston 199. An expansion spring 222 is mounted on the rod 217 and is positioned between one face of the boss 218 and a collar 223 carried by the rod 217 and this spring urges the plate 219 and rod 217 toward the left, as viewed in Fig. 18, thereby normally holding the valve 214 closed.

As the piston 199 moves back (toward the right viewing Fig. 18) and approaches the end of its stroke, it strikes against the plate 219 and slides it toward the right against the action of the spring 222. This action moves the valve 214 on its pivot 215 and uncovers the passageway 213. Air thereupon enters into the passageways 214, 211 and 212 and through the pipe 195 and passageway 124 into the suction cup 125 thereby breaking the vacuum. This releases the hold of the cup on the lowermost strip and it is then withdrawn from the magazine by devices which will now be described.

A pair of feed bars 251 (Figs. 10 and 11) are mounted for sliding movement within longitudinal grooves 252 formed in the raised section 79 of the frame 58. These bars are connected midway of their ends to a U-shape yoke 253 (see also Fig. 8) extending beneath and on opposite sides of the plate 106. The yoke 253 is provided with downwardly extending spaced lugs 254 having oppositely grooved faces 255 (Fig. 12) to provide a slideway for a block 256 pivotally connected to a pin 257 loosely mounted in a bifurcated end 258 of a lever 259 secured to a horizontal rockshaft 261 oscillating in bearings 262 formed in the bracket 57.

The lower end of the lever 259 is pivotally connected at 263 to a block 264 threadedly secured to a connecting rod 265 which joins with a cam yoke 266 (see also Fig. 5) having sliding engagement with a block 267 mounted on the shaft 162. The yoke 266 carries a cam roller 268 which operates in a groove 269 of a cam 271 secured to the shaft 162. Oscillation of the yoke 266, through the cam action just described, imparts a to and fro movement to said bars 251.

As illustrated in Fig. 11, the forward end of each bar 251 carries a block 275 in which a feed dog 276, held by a spring 277, is pivotally mounted on a pin 278. In the forward position of the bars 251 (this being toward the left in Fig. 11) the inner end of each dog 276 rests forward of the end of the lowermost strip a as the latter, after being separated from the stack of strips, is being held down by the suction cup 125. While the strip is so held, the bars 251 move backward and carry their respective feed dogs 276 along the opposite edges of the forward end of the strip, the springs 277 permitting a sliding action therealong.

As the dogs 276 are then carried forward with the following forward movement of the bars 251, the suction hold on the strip is released and the ends of the dogs move within their respective retaining blocks 275. Their opposed contacting faces thereupon tightly wedge against the strip gripping it firmly and pulling it from its position beneath the stack of strips within the magazine, the rollers 103 permitting free movement of the same. The strip while moving with the bars 251 is brought into engagement with feeding and with flanging and forming rollers which assist in complete withdrawal while performing their flanging and forming functions.

*Flanging and forming rollers*

Reference should now be had to Figs. 5, 8 and 9 wherein is illustrated the support for the feeding and flanging and forming rollers which comprises spaced side plates 301 mounted on the bracket 57. A center spacing block 302 is held in place between the plates by bolts 303, this block also resting on the bracket 57. The center spacing block 302 is provided with spaced channels 304 and 305, these being provided respectively for a lower feeding roller 306 and a lower flanging and forming roller 307 mounted on horizontal shafts 308 and 309.

A hardened steel plate 311, slotted to allow for clearance of the rollers 306 and 307, is mounted on the upper surface of the center block 302 and abuts rearwardly with a plate 312 which extends across and connects with the upper surface of the frame 58 at a position beneath the inner end of the roll support. It is over the upper surface of these plates 311 and 312 that the separated strip a passes from the magazine into engagement with the rollers 306 and 307. A top guide plate 313, carried by blocks 317, guides the strip in its proper travel. An upper knurled roller 315 is formed integrally with a shaft 316 which is journaled for rotation in two blocks 317 (Figs. 8 and 9) bolted to a spacer block 318 extending across the tops of the side plates 301. The spacer block 318 on each side is connected with vertically extending bolts 319 passing through vertical bores 321 formed in the plates 301.

There are two bolts 319 connected with each side of the spacer block 318 and each pair of bolts is threadedly engaged with a connecting block 322 located below the side plate 301 associated therewith and extending within a slot 323 formed in the bracket 57. A spring 324 is interposed between each block 322 and the associated side plate 301 and normally and yieldingly holds the blocks 318 and 317 downwardly thus holding the roller 315 against its companion roller 306. The spacer block 318 is suitably slotted to allow for clearance of the roller 315, as illustrated in Fig. 8.

The forming roller 307 is associated with an upper knurled roller 331 (Figs. 5 and 8) in a manner similar to the feeding rollers 315 and 308. The roller 331 is formed integrally with a shaft 332 which extends between and has rotary movement within spaced blocks 333 corresponding to the blocks 317 of the feeding rollers. Each block 333 is connected with a pair of vertically extending bolts 334 (see also Fig. 9) which extend through each of the side plates 301 and which connect with a block 335. Springs 336 are interposed between the side plates 301 and the blocks 335 to insure normal contact between the rollers 331 and 307 as in the similar construction of the feeding roller mountings. The blocks 335 in this instance are located in openings 337 formed in the bracket 57.

The feeding rollers 306 and 315 are rotated at high speed by a gear and chain construction connecting with an electric motor. For this purpose, the shafts 308 and 316 carry meshing gears 341 and 342 (Fig. 9). The gear 341 also meshes with a gear 343 rotating on a stud 344 threadedly secured to the face of one of the side plates 301. This gear 343 also meshes with an idler gear 345 rotating on a stud 346 also threadedly secured to the same side plate 301.

In a similar manner the flanging and forming rollers 307 and 331 are uniformly rotated at high speed, the shaft 309 (Figs. 5 and 9) carrying a gear 351 which meshes with a gear 352 carried by the shaft 332. The gear 351 also meshes with a gear 353 rotating on a stud 354 projecting outwardly from the face of the same side plate 301. The gear 353 meshes with the roller gear 345 and is connected with a sprocket 355 over which operates a chain 356 (Figs. 1 and 2) which passes over a sprocket 357 secured to a shaft 358 of an auxiliary high speed motor 359 mounted on an extension bracket 361 projecting outwardly from the table 56. The motor 359 thus provides the driving energy for the feeding rollers 315 and 306 and the flanging and forming rollers 331 and 307.

The strip a passing along the upper surface of the plate 312 and beneath the guide member 313, passes between the spring pressed feeding rollers and is moved forwardly by them at a faster rate of travel than the travel of the feed bars 251 and the strip is in this manner pulled from the dogs 276 which pivot to permit such action.

As the forward end of the strip a passes between the constantly rotating flanging and forming rollers, its edges are bent or shaped by cooperating surfaces of the rollers to provide the flanged edges e (Fig. 27). The strip then moves into engagement with a deflector plate 375 (Fig. 8) adjustably secured by means of bolts 376 against the upper surface of the center block 302. This block 302 is outwardly projected at this position and is provided with an opening 377 which allows movement of the bolt 376 and the deflector plate 375 relative thereto. Accurate adjustment is easily made by an adjusting bolt 378 threadedly engaged in a depending lug of the deflector plate and having its end abutting against the end of the projection of the center block. After the deflector plate has been brought into the desired position of adjustment, the same is securely bolted in place by the bolt 376.

The forward edge of the deflector plate 375 is beveled, as indicated at 379, and this beveled surface directs the strip upwardly in a curved path of travel and over a forming mandrel which will next be described. This action converts the strip a into the open annulus d, (Fig. 26).

*Horizontal forming mandrel with associated wings and guides*

The forming mandrel comprises a hollow shell 401 (Figs. 5, 8 and 17) supported at its rear end by a bracket 402 mounted on the bracket frame 188, the forward part of the shell being supported by and resting upon a plate 403 secured to a web of the arch frame 55. The plate 403 and the shell 401 are interengaged in a tongue and groove joint 404 and are securely clamped together by screws 405. The rear portion of the shell intermediate the end of the plate 403 and the bracket 402 is free around its entire surface and the forming mechanism just described is positioned adjacent the bracket 402, the upper forming roll being located interiorly of the shell and the strip a, in its travel into place on the mandrel, passing under, around and over the shell at this position.

A curved retaining plate or block construction is used at the forming station to guide the strip during this passage which comprises wings 411 and 412 (Figs. 5 and 8) located on opposite sides of the mandrel and pivoted at 413 on a supporting rod 414 secured at its rear end in the bracket 402 and at its front end in a block 415 carried by the arch frame 55. The wings 411 and 412 are formed with interiorly curved surfaces which correspond in shape and size to the outer surface of the mandrel 401. These surfaces are normally spaced a slight distance from the outer surface of the shell and form a continuous circular pass 416 for the strip as it is being brought into position on the mandrel.

Spring pressed shoes 417 are mounted for movement within slots 418 formed in the wings 411 and 412 and are secured to rods 419 sliding within projections 421 carried by the wings. A spring 422 is interposed between each shoe and its projection and yieldingly forces its shoe toward the mandrel and against the strip as it passes around the mandrel. The corners of the shoes adjacent their strip engaging surfaces are rounded and the strip in coming into position on the mandrel slips in between the shoe faces and the mandrel, the spring 422 permitting this action.

The wings 411 and 412 are normally held in their spaced pass forming positions by means of latches 425 pivoted on pins 426 carried in the bracket 402. The latches are hooked shape for engagement with locking pins 427 carried by the wings 411 and 412 and a spring 428, associated with each latch, holds it in latched engagement with its pin. This construction permits access to the annulus d or to the mandrel at this position, it being only necessary at such a time to disengage the latch 425 from its pin 427 and swing the wing associated therewith on the rod 414 into open position.

A cage-like construction of side wings and guide bars is used to properly retain the annulus d on the mandrel as it is moved therealong and for this purpose there is provided a number of pairs of wings 451, 452 (Figs. 5 and 17) pivoted at their upper ends adjacent each other and on the supporting rod 414. Guide bars 453 are extended between and carried by the wings 451 on one side and 452 on the other and these form longitudinally extending guide members for the advancing annulus. The wings 451 and 452, in normal position, hold the bars 453 spaced a slight distance from the outer surface of the shell 401.

As illustrated in Figs. 5 and 7, a latch member is provided for holding these wings 451 and 452 and bars 453 in normal position, this latch member comprising a locking bar 461 pivoted at 462 to a collar 463 secured to the rod 414. The bar 461 is formed with a locking fin 464 which, when in latched position, rests within slots 465 and 466 formed respectively in the upper surfaces of a pair of the wings 451 and 452 above their pivotal connection with the rod 414.

A hand clamp is provided for holding the bar 461 in locked position; this comprises a collar 467 secured to the rod 414 and spaced from the collar 463 by the central pair of wings 451 and 452. A threaded clamp bolt 468 is pivoted on a pin 469 carried by the collar 467 and swings into locking position in a slot 471 formed in the free end of the locking bar 461. A clamp hand nut 472 is threadedly engaged on the bolt 468 and when the latter is in the slot 471 and its nut 472 is screwed down into locking position against the bar 461, it can not be lifted to disengage its locking fin 464 from the slots 465 and 466.

When it is desirable to inspect the annulus $d$ or remove it from the mandrel, the hand nut 472 is unscrewed from its locking position on the bolt 468 sufficiently to permit swinging of the latter on the pin 469 and out of the slot 471. The locking bar 461 is thereupon free and may be swung upwardly on its pivot 462, releasing its locking fin 464 from the slots 465 and 466. The wings 451 and 452 and the guide bars 453 carried thereby can then be lifted to open position, the wings pivoting on the supporting rod 414.

Reciprocating feed bars

Grooves 501 and 502 (Fig. 17) are formed in the outer surface of the shell 401 and a sliding feed bar 503 (shown in detail in Fig. 15) moves along the groove 501 and two feed bars 504 (shown in detail in Fig. 14) move in the grooves 502. The groove 501 is formed in the top edge of the shell 401 and the grooves 502 are located on opposite sides adjacent the lower part thereof. The bars 503 and 504 are connected together intermediate their lengths by means of a spider frame 505 (Figs. 5 and 17) which carries an extension yoke 506, extending downwardly within slots 507 and 508 formed respectively in the lower part of the shell 401 and the plate 403.

Yoke 506 is pivotally connected at 509 to a link 511 (see also Fig. 24) also pivoted at 512 to the upper end of an arm 513 which oscillates on a fixed horizontal shaft 514 carried in projecting lugs 515 extending downwardly from the table 56.

The arm 513 intermediate its length is pivoted at 517 (Figs. 5, 22 and 24) to an arm 518 of a pitman 519 connecting with a crank 521 formed in a horizontal shaft 522 journaled in bearings 523 (see also Fig. 6) formed in the table 56.

The shaft 522 is driven by connection with the shaft 162, the former carrying at one end a bevel gear 525 which meshes with a gear 526 secured to the upper end of a shaft 527 journaled in a housing 528 bolted to a side wall of the table 56. The shaft 527 also carries a bevel gear 529 which meshes with a gear 531 formed on a horizontal shaft 532 journaled in a bearing 533 formed in the table 56. The shaft 532 also carries a bevel gear 534 which meshes with a similar gear 535 carried by the shaft 162.

A gear cover 536 encloses the gears 525 and 526 and a similar cover 537 encloses the gears 529 and 531. By means of the connection just described, the spider frame 505 is moved back and forth within the mandrel shell 401 and the feed bars 503 and 504 connected with the spider are correspondingly reciprocated.

The single feed bar 503 and the pair of feed bars 504, as illustrated in Fig. 17, move on the inside of the annulus $d$ as it rests on the shell 401. The bar 503 is provided with a series of spaced feed dogs 551 (Fig. 15) pivoted at 552 within slots 553 cut in the bar 503 and these feed dogs provide means for advancing the annulus in a forward direction along the axis of the supporting mandrel as the bar moves forward. A leaf spring 554 is associated with each feed dog 551 and normally holds the dogs with their forward ends extending outwardly beyond the periphery of the shell 401.

In a similar manner, the bars 504 are provided with spaced feed dogs 561 (Fig. 14) pivoted thereto at 562, the dogs being located in slots 563 cut therein. A leaf spring 564 is associated with each feed dog 561 and normally holds the dogs with their annulus engaging ends projected beyond the surface of the bar and outside of the periphery of the shell 401.

Other spring pressed dogs of usual construction and indicated generally by the numeral 565 (Fig. 17) are carried in certain of the guide bars 453 and these project into engagement with the rear edges of the annuli $d$ as the latter are moved along the mandrel. This prevents backward movement of the same with feed bars when the bars return on their backward or idle stroke. The annuli $d$ are thus advanced along the mandrel and through a series of idle stations located both before and after an edging station.

The bars 504 extend only as far as the idle station adjacent the station where the ends of the annuli are hooked together and after an annulus has been moved this far, it is further advanced by the forward end of the single bar 503. The forward end of this bar is enlarged at 566 (Figs. 15 and 16) and is further split into two spaced ends 568 which carry other feed dogs 569 of the same construction as the dogs 551. The dogs 569 are pivoted on pins 570 and are located in slots 571 formed in the ends 568. Springs 572 are used to normally hold the dogs 569 in annulus engaging position.

Edging of the annulus

The incompleted annulus $d$ is brought to rest at the edging station where its ends are bent in opposite directions to provide the hooks $f$ (see Fig. 28). At this station the mandrel shell 401 is solid throughout its upper part, as illustrated in Figs. 5 and 18, and its lower section is recessed at 575, this recess extending longitudinally of the edging mechanism.

A block 576 is positioned in the recess 575 and is secured to the solid part of the horn by screws 577. The exterior lower surface of the block 576 is circular and its outer wall forms a continuation of the circular wall of the mandrel. The block 576 is provided with slots 578 in which the feed bars 504 slide. The block 576 is also provided with a circular walled chamber 579 which extends along the lower central part of the block.

An oscillating part of the edger mechanism is located within the chamber 579 and this comprises a cylindrical member 581 (Figs. 5 and 18) mounted on a rockshaft 582 journaled in spaced plates 583 mounted on a spacer block 585. The spacer block is mounted upon and held by a clamping block 586 which rests on a post 587, the latter being an integral part of a frame 588 carried by the table 56.

As illustrated in Fig. 18, the post 587 is extended upwardly along its rear edge at 589 and terminates in an overhanging part which engages a projection 591 formed on the block 585. The clamping block 586 in its position on the post 587, abuts at one side against the extension 589. Clamping bolts 592 extend through a clamping plate 593 and through the clamping block 586 and at their ends threadedly engage the extension 589 of the post 587.

The clamping plate 593 is formed with spaced angular projections 594, the upper projection engaging within and fitting a slot 595 formed in the block 585 and the lower projection engaging within and fitting a slot 596 formed in the post 587. This construction provides a simple and accurate connection for the edging mechanism and at the same time allows for easy removal thereof.

The cylindrical edging member 581 (Figs. 18, 19 and 20) is grooved on opposite sides at 601 and 602 and in these grooves are respectively located edging steels 603 and 604 which cooperate with other edging members to bend the ends of the collar annulus d during oscillation of the member 581.

This oscillation is effected by connection with the rockshaft 582 on which the member is mounted. This rockshaft projects beyond one of the plates 583 (Fig. 5) and carries an arm 611 connected by an adjustable link 612 (see also Fig. 18) which is pivoted at 613 to the upper end of an arm 614 mounted on a rockshaft 615 journaled in bearings 616 projecting downwardly from the table 56. The arm 614 carries intermediate its length a roller 621 (see also Figs. 5 and 22) which operates within a groove 622 of a barrel cam 623 carried on the shaft 522.

Also located between the plates 583 are other edging die members, as illustrated in Fig. 18. These members comprise an edging jaw 630 mounted on a shaft 631 carried by the plates 583 and a similar jaw 632 pivoted on a shaft 633 also carried by the plates 583. The jaws 630 and 632 (see also Figs. 19 and 20) are on opposite sides of the edging member 581 and are adapted to be pivoted on their respective shafts 631 and 633 to bring their outer ends into cooperative position with the annulus d on the mandrel to effect the edging operation. The outer end of the jaw 630 is formed with a concave face 635 adapted to be brought into clamping position against one end of the annulus, in order to hold it tightly against the mandrel section 576 and in like manner, the outer end of the jaw 632 is formed with a concave face 636 which holds the opposite end of the annulus in clamped position on the mandrel section.

The circular face 635 of the jaw 630 terminates as a projection 637 which forms one of the walls of a recess 638 cut in the jaw 630. This recess 638 is provided to clear the edging die member 603 as it oscillates for the edging operation. The projection 637 forms an anvil over which one of the projecting ends of the annulus d is bent by oscillation of the die part 603, as illustrated in Fig. 19.

The circular face 636 of the jaw 632, in like manner, terminates as a projection 642 which forms one of the walls of a recess 643 cut in the jaw 632. This recess provides clearance for the die parts 604 and 581. A projection or anvil 644 is formed in the block 576 and its face provides one of the walls of the chamber 579. This anvil 644 cooperates with the die member 604 to bend the opposite projecting end of the annulus d as the member 581 is oscillated in the edging operation.

The jaws 630 and 632 are pivoted on their respective shafts and brought into clamping position by a link device illustrated in Fig. 18. The spacer block 585 is formed with a rectangular channel 651 (also shown in Fig. 5) in which slides a rectangular bar 652. The bar 652 is slotted at 653 to provide clearance for the end of a link 654 which is pivotally mounted on a rod 655 set in the bar 652. The opposite end of the link 654 is pivotally connected at 656 to the jaw 630. In similar manner the bar 652 is also slotted at 661 to provide clearance for a link 662 which is pivoted on a rod 663 also set in the bar 652. The opposite end of the link 662 is pivoted at 664 to the jaw 632.

With the bar 652 in the position illustrated in Fig. 18, the jaws 630 and 632 are in open or non-clamping position and as the bar 652 is moved toward the right, the link connection just described operates to close the jaws and clamp the ends of the annulus securely against the mandrel part 576, (Figs. 19 and 20). The bar 652 is loosely and pivotally connected at 671 to the upper end of an arm 672 which is secured to a horizontal rockshaft 673 (see also Fig. 1 and 22) journaled in bearings 674 carried on the frame 588. The shaft 673 also carries an arm 675 on which is rotatably mounted a roller 676 which operates in a cam groove 677 formed in the periphery of a barrel cam 678 carried by the shaft 522.

The ends of the annulus $d$ when first brought into position at the edging station, extend beyond the walls of the chamber 579 and project into slots 685 and 686 formed respectively in the faces of the dies 603 and 604. Such position is illustrated in Fig. 18. When the jaws 630 and 632 are raised into clamping position, these annulus ends still remain in the slots 685 and 686. The member 581 is then first oscillated in a clockwise direction whereupon rounded walls of the slots 685 and 686 bend the ends of the annulus over the respective anvil members 637 and 644 of the jaw 630 and the mandrel block 576 previously described.

This forms oppositely disposed partially formed hooks on the ends of the annulus, as illustrated in Fig. 19, and then with the clamping jaws 630 and 632 still in clamping position, the member 581 is oscillated in the opposite or counter-clockwise direction and is brought into the position illustrated in Fig. 20. During this movement the hooks are shaped in the annulus by a further bending of the incompleted hooks over the anvils. In this latter return oscillation of the member 581 a die face 687 formed in the edging steel 603 tightly presses one annulus end against its associated anvil 637. At the same time a die face 688 formed in the die part 604 tightly presses the opposite annulus end against its associated anvil 644. This action irons out and shapes the hooks to predetermined form and thereby completes the edging operation.

The edged annulus is thence moved along the mandrel, through a series of idle stations and is finally brought to rest at the seam closing station.

*Interlocking edges and closing seam*

An auxiliary mandrel or horn is secured to the forward end of the regular mandrel and constitutes the holding support for the annulus $d$ at the seam closing station. It is while held in place on this auxiliary horn that the hooked ends $f$ of the annulus are first interlocked, as illustrated in Fig. 29 and finally permanently secured together in the seam $g$, as illustrated in Fig. 30.

The auxiliary mandrel comprises a body 701 (Figs. 5 and 23) which extends rearwardly in a stem section 702 which is secured in the end of the mandrel 401. The auxiliary mandrel is securely held in position by a bolt 703 which also passes through and clamps the plate 403 and the forward end of the shell 401 to the web of the arch frame 55.

The auxiliary mandrel is adapted to be collapsed and expanded and has an end plate 704 secured to its outer end. Two contracting and expanding side plates 705 are movably mounted on opposite sides of the forward end of the body 701 and are thus positioned between the plate 704 and the end of the mandrel shell 401. When these side plates 705 are held in expanded position, the outer periphery of the same form a continuation with the outer periphery of the top and bottom faces of the extended mandrel part 701 and constitute the complete circular auxiliary mandrel, the diameter of which is smaller than the diameter of the mandrel 401.

The side plates 705 (Figs. 21 and 23) interlock with the mandrel body 701 in a tongue and groove connection 706. A plate 707 is secured by screws 708 to the central part of the inner face of each plate 705 and a bolt 709 is positioned within an opening 711 formed in each side plate 705. This bolt 709 passes through the plate 707, the latter having a loose fit on the bolt.

Each bolt is threadedly secured at its inner end to the mandrel body 701, its head confining a spring 712 against the plate 707. The springs 712 tend to force each side plate 705 inwardly towards collapsed position but provision is made for preventing, at certain times, this collapse of the auxiliary mandrel.

Wedge blocks 713 secured to screws 714 project inwardly from each side plate 705 and have sliding movement within slideways 715 formed in the mandrel body 701. There are two wedge blocks 713 for each side block 705, the pair of wedge blocks on one side being disposed opposite the pair on the other side. The inner extremities of the blocks 713 engage a sliding rod 716 having movement longitudinally of the auxiliary mandrel. Depressions 717 formed in the rod 716 permit inward movement of the wedge blocks 713 and the collapse of the auxiliary mandrel when the rod 716 is in position to align the depressions with the ends of the wedge blocks.

When the depressions are out of register with the extremities of the blocks 713 the latter are held outwardly by the rod and the auxiliary mandrel is thereby expanded. The rod 716 extends through the end of the stem 702 and a coil spring 718 encircles the extended part of the rod and is located within a counterbore 719 formed in the stem. The spring 718 is adjustably confined between the inner wall of the counterbore and a collar 721 which is held on the end of the rod 716 by locknuts 722.

The spring 718 normally holds the rod 716 toward the left (Fig. 23) with the auxiliary mandrel in collapsed position and with the inner ends of the blocks 713 within the depressions 717 of the rod 716 and it is so held during the introduction of the hooked formed annulus $d$ at this station.

The first operation to take place at this station is the clamping of the annulus to the top of the mandrel by a vertically sliding clamping bar 740 (Figs. 5 and 21) operating in guideways formed in a bracket 741 screwed to the web of the frame 55. The lower face of the bar 740 is slightly curved to exactly fit and tightly engage the outer surface of the annulus $d$ during this clamping action.

The upper extremity of the bar 740 is slotted and thereby loosely connected with a boss 742 formed on one end of a lever 743 pivoted on a fixed stud 744 secured to the frame 55. The opposite extremity of the lever 743 is pivotally connected at 745 with an adjustable connecting rod 746 pivotally connected at 747 to a three-arm lever 748 pivoted on a fixed stud 749 threadedly engaging the web of the frame 55. One arm of the lever 748 carries a cam following roller 751 engaging the peripheral cam surface 752 (see also Fig. 5) of a composite cam 753 secured to the shaft 162. An arm 754 of the lever 748 is yieldingly connected, by means of a coil spring 755, with a post 756 projecting from the frame 55. This insures engagement at all times between the cam roller 751 and the cam surface 752.

With the annulus $d$ thus clamped at the top of the collapsed auxiliary mandrel, side wings engage the annulus and wrap it against the side walls of the mandrel and interhook the edges $f$, one of the side wings operating slightly in advance of the other for this purpose. These side wings, designated by the numerals 761 and 762, (Fig. 21) are pivoted respectively at 763 and 764 to an end 765 of the block 741.

Each side wing is also pivotally connected to a block 766 in which is secured a rod 767 passing at its upper end through the boss of a block 768, each rod having slight sliding movement in its boss. A coil spring 769 surrounds each rod 767 and is interposed between the blocks 766 and 768 and forms a yielding connection for each side wing. A collar 771 is secured to the upper end of each rod 767 above the boss 768 and limits the sliding of the rod under the expansive action of its spring.

The two blocks 768 are pivotally connected at 781 to a rocking lever 782 pivoted on a fixed stud 783 carried by the frame 55. The outer end of the lever 782 is pivotally connected at 784 to an adjustable connecting rod 785 pivotally connected at its lower extremity 786 to a lever 787 in turn pivoted on a stud 788 carried by the frame 55. The lever 787 carries, intermediate its length, a cam roller 789 (see also Fig. 5) operating within a cam groove 790 formed in the outer face of a cam 791 secured to the shaft 162.

With the hooked edges $f$ of the annulus interengaged by action of the side wings 761 and 762, as just described, the outwardly extending hook on one end of the annulus lays against the mandrel wall and the inwardly extending hook on the other end of the annulus lays on the outside of the first hook. To effect full engagement of the hooked ends, the auxiliary mandrel is expanded and this action brings the hooked ends $f$ into the position illustrated in Fig. 29.

Expansion of the mandrel is effected by sliding of the rod 716 (Figs. 5 and 23) toward the right and against the action of the spring 718. For this purpose the rod 716 is slotted at 801 and a bar 802 is located in the slot and has vertical movement therein. The upper edge of the bar is tapered at 803 for engagement with a tapered wall 804 of the slot 801. Engagement of the angular surfaces 803 and 804 by raising of the bar 802, forces the rod 716 into the position illustrated in Fig. 23 wherein the wedge blocks 713 are moved outwardly and the side plates 705 are brought into expanded position.

The bar 802 is carried on a vertically moving member 809 secured by a sliding wedge clamp 811 (Figs. 5 and 21) to a slide 812 moving in slideways 813 formed in side gibs 814 bolted to the web of the frame 55. The wedge clamp member is formed with a tapered face 816 which cooperates with a correspondingly tapered face 817 of the slide 812. The member 811 is slotted at 818 to provide clearance for a clamping bolt 819. For clamping the members 809, 811 and 812 together other clamping bolts 821 are threadedly secured in the slide 812 and these bolts in cooperation with the bolt 819 hold the wedge member 811 in adjusted position.

The member 809 is laterally extended at its bottom to provide two lugs 825 in each of which a bolt 826 is located. The bolts 826 extend downwardly and connect the lugs 825 with lugs 827 formed on opposite sides of the upper end of a yoke 828 which has a central upwardly projecting post 829 sliding within a vertical bore 831 formed in the slide 812.

A spring 832 surrounds each bolt 826 and is interposed between its associated lugs 825 and 827 and provides a yielding connection between the yoke 828 and the member 809. Nuts 833 threadedly engage each bolt 826 on opposite sides of its lug 827 and provide means for adjusting the compression of the spring 832 to alter the yielding connection between the yoke 828 and the member 809 for a purpose hereinafter described.

The yoke 828 is pivotally connected at 841 to an eccentric strap 842 which surrounds an eccentric 843 formed as an integral part of the composite cam 753 on the shaft 162.

With the hooks $f$ of the annulus $d$ interengaged and the auxiliary mandrel in its expanded position and tightly holding the annulus, the interhooked ends thereof are engaged by a bumping hammer 845 (Figs. 5 and 21) which is an integral part of the member 809. This produces a seam $g$ (Fig. 30) and unites the ends of the annulus forming a closed band.

The stroke of the eccentric 843 is in excess of the travel of the slide 812 necessary to bring the upper surface of the hammer 845 against the interhooked ends of the annulus and this excess stroke is taken up by a yielding of the springs 832, the post 829 moving within its bore 831. The effective pressure, therefore, brought against the seam by the rising hammer 845, resisted by the lower surface of the auxiliary mandrel body, depends upon the resistance of the springs 832 which, it will be recalled, may be adjusted to give the proper compression.

As the member 809 is lowered, following the seam closing action just described, the bar 802 is withdrawn from the slot 801 and the spring 718 thereupon shifts the rod 716 toward the right (Figs. 5 and 23) and releases the side plates 705 of the auxiliary mandrel. The springs 712 thereupon collapse these side plates making the outside diameter of the auxiliary mandrel less than the inner diameter of the flanged edges of the band, which is thereupon free to be moved from the mandrel for a subsequent operation. This movement from the mandrel is effected by the forward pair of feed dogs 569 associated with the feed bar 503.

*Turret feed*

Figure 2:
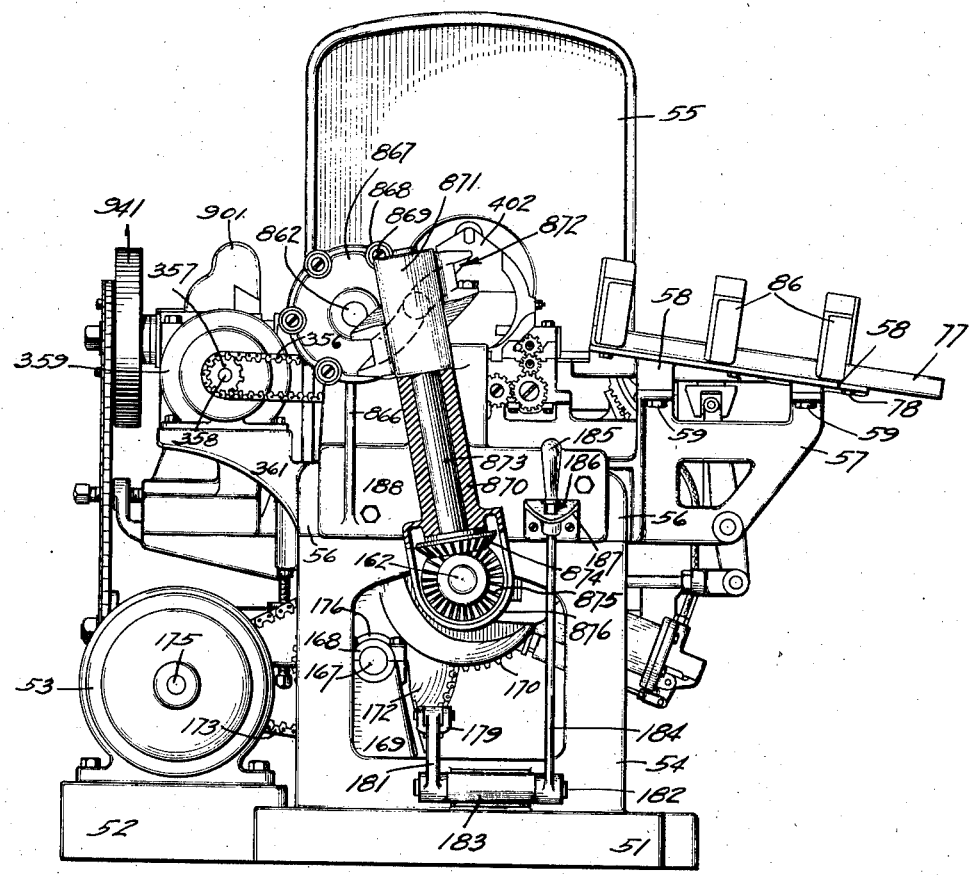
Fig. 2 is an end elevation of the machine viewed from the feed or rear end, parts of the gear housing being broken away to illustrate details of construction.
Figure 3:
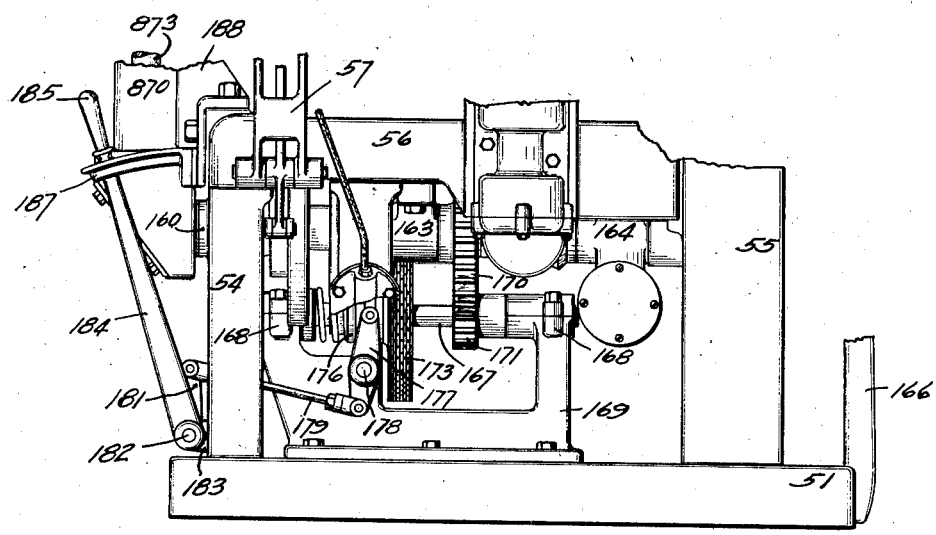
Fig. 3 is a fragmentary side elevation of the lower part of the machine.
Figure 4:
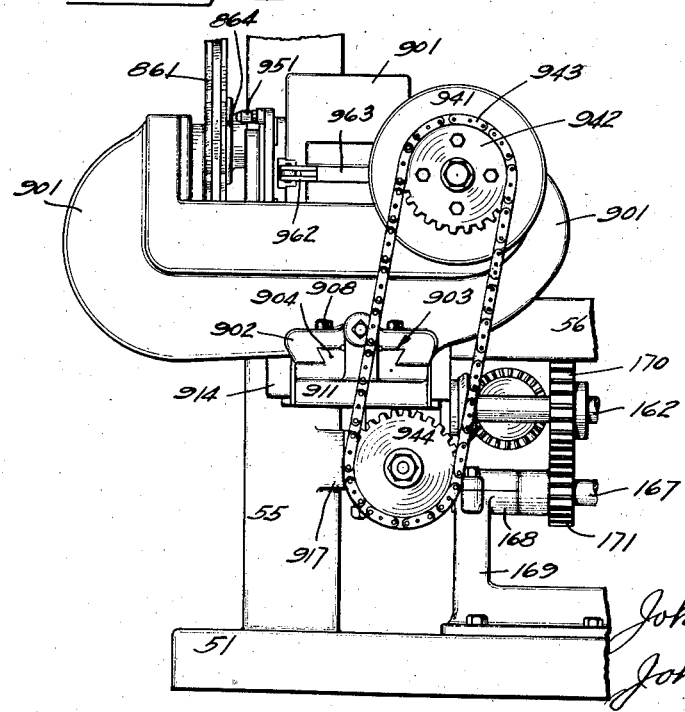
Fig. 4 is a fragmentary side elevation of the lower part of the machine as viewed from the opposite side.

A turret 861 (Figs. 1, 5, 21 and 22) is mounted on one end of a horizontal shaft 862 and is secured by bolts 863 to a collar 864 which is also secured to the shaft 862. Shaft 862 is journaled in a bearing 860 formed in the web of the arch frame 55 and in a bearing 865 formed in an extension 866 of the bracket 188 (Fig. 2). The shaft 862 and the turret 861 are moved intermittently by a special form of Geneva mechanism illustrated particularly in Figs. 1 and 2.

This Geneva mechanism comprises a Geneva wheel 867 mounted on the opposite end of the shaft 862 from the turret end and adjacent the bearing 865 and this wheel carries a series of spaced conical rollers 868 loosely mounted on studs 869. There are disclosed in the drawings six such rollers which effect six step movements for one complete rotation of the shaft 862. The wheel 867 and its rollers 868 form the driven element of the Geneva mechanism.

The driving element comprises a segmental cam 871 having an interrupted groove 872 extending throughout practically 180 degrees and this grooved part of the cam moves along and over one of the rollers 868. The vertical distance between one end of the groove and the other end is such as to shift the position of the engaged roller while the 180 degree peripheral extent of the grooved track passes along the roller. This roller can only move with its supporting wheel 867 and the latter is thereby turned a distance equal to the distance between two adjacent rollers 868, this distance being ⅙ of a revolution or 60 degrees.

This movement of the wheel 867 brings the next adjacent roller into the same position formerly occupied by the engaged roller and the next adjacent roller is then in position to be engaged by the grooved cam 871 on its next revolution. As the terminal end of the cam groove leaves a roller, following the step rotation of the Geneva wheel just described, there results a rest or stop in the turret movement while the cam 871 moves through its remaining 180 degrees and until it again engages the next adjacent roller for the next succeeding step movement.

Cam 871 is mounted on the upper end of a shaft 873 which extends at a slight angle to the vertical and is journaled in a sleeve 870 formed as an integral part of the bracket 188. The shaft 873, at its lower end, carries a gear 874 which meshes with a corresponding gear 875 secured to one end of the shaft 162. A gear housing 876 carried by the bracket 188 encloses the gears 874 and 875.

The turret 861 (Figs. 21 and 22) is provided with a series of spaced pockets 891, there being the same number of pockets (six, in the present embodiment) as there are rollers 868. Each movement of the turret 861, being through 60 degrees, therefore, advances one pocket into the position formerly occupied by a preceding pocket and the turret completes one rotation in six intermittent movements.

During each rest period of the turret, certain operations take place in connection with the formation of the collar band, the first operation being insertion of the closed band into one of the pockets 891 by removal of it from the end of the auxiliary mandrel, as previously described. This takes place at the station designated by the letter L, in Fig. 21. Two idle stations M and N are then successively passed by pockets of the moving turret and in the next following station, designated by the letter O, the edges of the band are curled by a mechanism which will now be described.

*Collar band curling*

The mechanism relating to the operations of this station is carried in a sub-press frame 901 (Figs. 2, 4, 22 and 24) having a foot 902 slotted at 903 for the reception of a tongue 904 formed in a bracket 905. The construction permits horizontal adjustment of the frame 901 relative to the bracket 905, the tongue 904 and slot 903 providing the proper sliding connection.

The bracket 905 is formed with an extension 906, in which is threadedly mounted an adjusting bolt 907, the end of which abuts against the foot 902 of the frame 901. After the frame has been properly positioned, it is locked in clamped position by bolts 908 passing through slots 909 (Fig. 24) formed in the foot 902 and threadedly engaging the bracket 905.

The bracket 905 is formed with a vertically extending wall 911 (Figs. 4, 22 and 24) which is provided with beveled end walls 912 which slidably engage within correspondingly shaped walls 913 provided by a spaced projection 914 extending outwardly from the arch frame 55 and in a similar projection 915 extending outwardly from the table 56. This construction allows for a vertical adjustment of the bracket 905 relative to the frame 55 and the table 56.

An adjusting screw 916 is used to assist in such vertical adjustment and has threaded engagement within a boss 917 projecting outwardly from the frame 55. The bracket 905 and all parts carried thereby rest upon the adjusting screw 916 during such adjustment and when they have been brought into proper vertical position, they are rigidly locked to the table 56 by bolts 918 threadedly engaging the table and passing through slots 919 formed in the wall 911 of the bracket. The frame 901 is in this way positioned both vertically and horizontally to insure proper registry with the turret pockets of certain parts carried thereby.

The closed band $d$ fits the turret pocket 891 with sufficient friction to hold it securely in place (Fig. 22) and the edges thereof are equally spaced from the front and rear faces of the turret 861. The turret adjacent the station O passes between parts of the press frame 901, the forward face of the turret moving adjacent a die block 921 (Figs. 13 and 22) carried by the frame.

The turret pocket and its band, when at station O, is in alignment with a curling die 922 which has an annular flange 923 engaged by a clamping ring 924 secured by bolts 925 to a head 926 of a press slide 927. The press slide 927 is provided with extensions 928 (Fig. 24) which are engaged by beveled walls 929 of V-shape grooves 931 formed in the press frame 901. The slide 927 moves back and forth in a horizontal plane, its extensions 928 keeping it properly aligned while moving within the grooves.

To effect this movement, the slide 927 is provided with a trunnion 932 which is pivotally connected with an arm 933 (see also Fig. 1) of a pitman 934 operating on a crank 935 formed in a crankshaft 936 journaled in bearings 937 formed in the press frame 901.

The crankshaft 936 carries a flywheel 941 (Figs. 1, 22 and 24) on which is mounted a sprocket 942 over which operates a chain 943 passing over a second sprocket 944 secured to one end of a horizontal shaft 945 journaled in a sleeve 946 carried by a housing 947 secured to the table 56.

The oposite end of the shaft 945 carries a spiral gear 948 (see also Fig. 5) which meshes with a similar gear 949, carried by the shaft 162. Rotation of the crankshaft through the described connections moves the slide 927 and causes the die 922 carried thereby to move into the pocket 891 of the turret 861 and engage the closed band $d$ positioned therein.

To insure accurate registration between the turret pocket 891 and the die member 922, the turret is engaged by a pilot pin 951 (Fig. 22) bolted to the head 926 of the slide 927 and this pilot pin is tapered at its outer end to guide it into one of six spaced horizontal bores 952 (Fig. 21) formed in the turret 861. There is a bore 952 associated with each of the pockets 891 and by this engagement of the pilot pin within the bore associated with the turret pocket at the station O, the turret is held in an exact position so that all of the pockets properly register at their respective stations.

The forward face of the die member 922 (Fig. 13) is provided with an annular groove 953 which engages one of the flanged edges $e$ of the band $d$ within the aligned turret pocket and forces the band along the pocket wall and against the die block 921. An annular groove 954 is cut in the face of the die block 921 in axial alignment with the band and as the latter is moved toward the right into the position illustrated in Fig. 13, the annular grooves 953 and 954 curl the two flanged edges $e$ of the band and form edge curls $k$, thereby completing the construction of the collar.

The slide 927 is then returned on its backward stroke and the die member 922 is withdrawn from the turret pocket. During this withdrawal, other mechanism operates to return the curled collar $j$ from the position just described (Fig. 13) into its former central position (Fig. 22) within the turret pocket.

Figure 21:
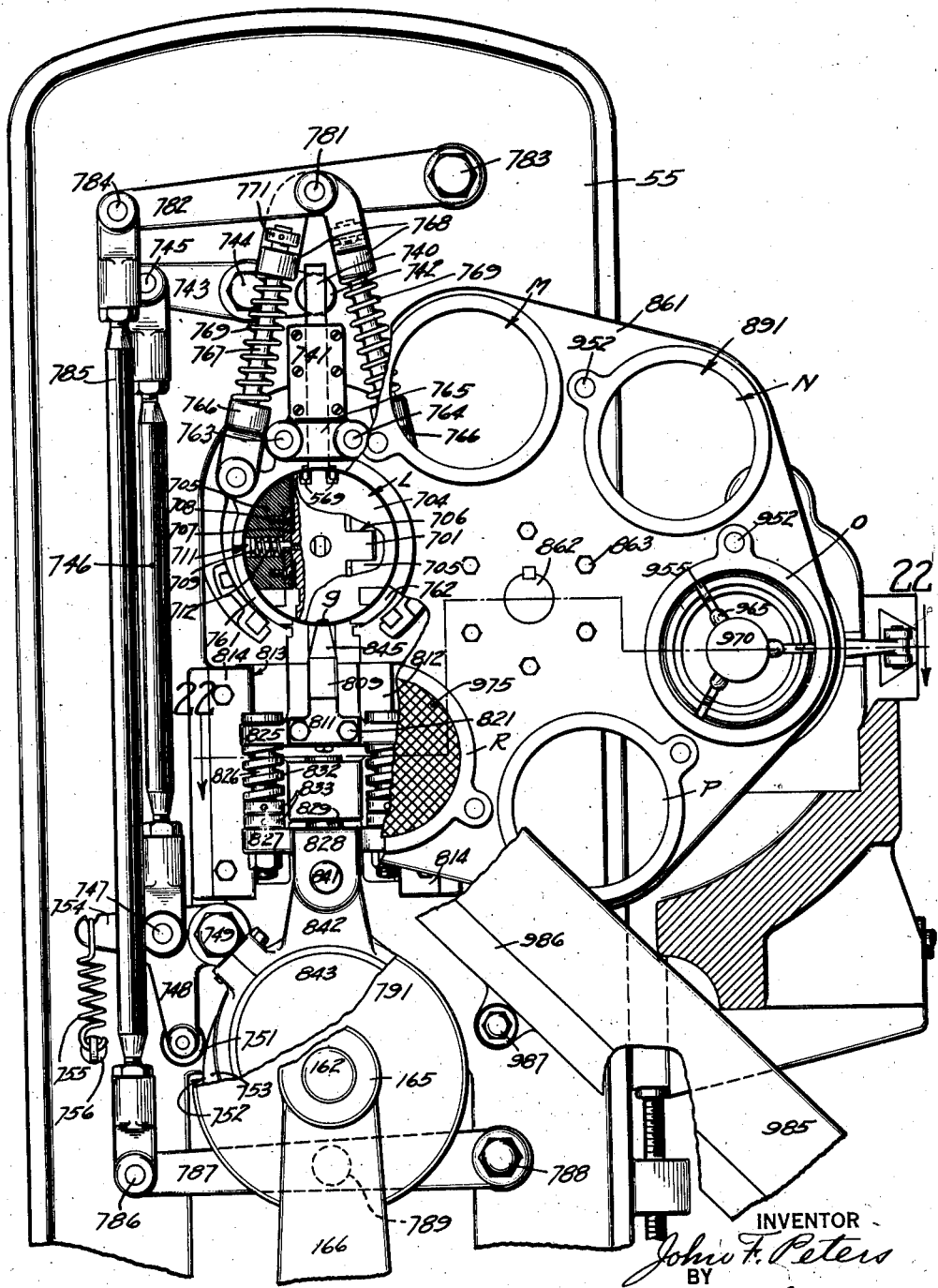
Fig. 21 is an enlarged front elevation of the machine, parts being broken away and parts shown in section, this being of the discharge end of the machine.

This mechanism is illustrated in Figs. 13, 21 and 22 and comprises three dogs 955 pivoted at 956 to a sliding member 957 carried by a shaft 958 sliding within the center of the head 926 of the slide 927. The rear end of the shaft 958 is pivotally connected at 959 to a lever 960, which is in turn pivoted at 961 to the slide 927. The opposite end of the lever is pivotally connected by a link 962 with a slide 963 (see also Fig. 24) moving within a slideway 964 formed in the press frame 901. The opposite end of the slide 963 carries a roller 964 which operates within a groove 965 formed in one face of the flywheel 941.

The shaft 958 is thus cam moved and at times travels in unison with the slide 927, carrying the member 957 and the dogs 955 back and forth. During the backward movement of the member 957, a hooked end 966 (Fig. 13) of each finger 955 engages the inner wall of one of the curls $k$ of the collar $j$ and cooperating with the other fingers slides the collar along the pocket wall into its former central position. Throughout a part of this return movement, the fingers 955 are held in the position illustrated in Fig. 13 where their ends 966 are held close to the inside wall of the band. This position of each finger 955 is maintained by engagement of a cam projection 967, formed adjacent one end of each finger, which engages with a cylindrical wall 968 formed on the interior of the die member 922. A spring barrel 969 is associated with each finger and slides within a block 970 inserted in the end of the head 957. A spring 971 is confined within the barrel and yieldingly forces the same against the finger.

After the collar $j$ has been returned to its central position within the pocket 891 by a combined movement of the member 922 and the shaft 958, the latter is moved backward relative to the moving slide 927 and this moves each finger 955 so that its projection 967 disengages the inner cylindrical wall 968 of the die member 922. A conical cam surface 972 is formed in the member 922 adjacent the groove 953 and this surface now engages a projection 973 formed on the forward end of each finger 955 and causes the fingers to rock on their pivots 956 against the action of their springs 971.

The pivoting of the fingers 955 moves their hooked ends 966 away from the inner wall of the collar a sufficient distance to clear its curled edge and leaves it in its central position within the pocket of the turret. Both the die member 922 and the fingers 955 are entirely withdrawn from the turret 861 and returned to the position illustrated in Fig. 22.

Collar band discharge

With the next step rotations of the turret, the completed collar $j$ resting in its pocket is moved first into an idle station P (Fig. 21) and thence into the discharge station R. From this station the collar is removed from the turret and allowed to roll out of the machine as will now be described.

The pocket 891 containing the curled collar $j$ is in axial alignment with a knockout pad 975 (Figs. 21 and 22) carried on an arm 976 secured to the forward end of a rod 977 sliding within a guideway 978 formed in the frame 55. The opposite end of the rod 977 is adjustably secured to a block 979 which has sliding movement on a fixed rod 980 suspended between the frame 55 and a bracket 981 projecting upwardly from the table 56. The block 979 is formed with a projection 982 on which a cam roller 983 is mounted. This roller is adapted to operate within a groove 984 formed in the face of the composite cam 623 carried on the shaft 522.

With the turret at rest and the collar $j$ in the turret pocket, the knockout pad 975 moves forward, under the action of the cam 623 acting through the described mechanism, and entering the pocket of the turret engages the collar and forces it out of the turret. The collar thereupon falls into a discharge chute formed by spaced vertical walls 985 (Figs. 5 and 21) supported by a channel iron 986 bolted at 987 to the frame 55. This channel iron 986 forms the floor of the chute which extends at a steep angle which causes the discharged collar $j$ to roll along the chute and out of the machine.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:—

1. In a machine for forming metal bands, the combination of a forming mandrel, means for arranging a metal strip upon said mandrel, means for forming hooks on the ends of said strip while on said mandrel, means for interengaging said hooked ends and forming a closed seam therefrom to provide a continuous band, mechanism for bending and curling the two continuous and opposite edges thereof, and power mechanism for cooperating said elements in timed relation.

2. In a machine for forming metal bands, the combination of a forming mandrel, means for arranging a metal strip upon said mandrel, means for forming hooks on the ends of said strip while on said mandrel, means for interengaging said hooked ends and forming a closed seam therefrom to provide a continuous band, curling mechanism including curling dies operating axially of said band for simultaneously bending and curling the opposite edges thereof, and power mechanism for cooperating said elements in timed relation.

3. In a machine for forming metal bands, the combination of a magazine for holding strips, a forming mandrel, devices for removing individual strips from said magazine and arranging the same upon said mandrel, means for bending the ends of said strip into hooks while on said mandrel, means for interengaging said hooked ends and forming a closed seam therefrom to provide a continuous band, devices for removing said band from said mandrel and presenting it to a curling station, curling dies for simultaneously bending and curling the opposite edges of said band, and power mechanism for cooperating said elements in timed relation.

4. A machine for forming metal bands having a series of stations, comprising a forming mandrel, means for arranging a strip upon said mandrel at a first or forming station, primary feeding devices for transferring said formed strip along said mandrel to a second or edging station and from devices operating respectively at said stations, thence to a third or seam closing station to bend said strip into cylindrical form, to form its ends with hooks, and interengage the hooked ends and tightly clamp them in a closed seam thereby providing a continuous annular band, secondary feeding devices, including a turret, for transferring said band from said mandrel to a curling station, two curling dies operating at said curling station to engage two side edges of the band to curl the same into circular cross sections, and power mechanism for cooperating said elements in timed relation.

5. In a machine for forming metal bands, the combination of a forming mandrel, a pocketed turret, means for transferring an annular metal band from said forming mandrel into a pocket of said turret, means for advancing said turret and said metal band carried thereby to a station, curling mechanism at said station for bending and curling the edges of said metal band while moving the same to one side of the turret pocket, and instrumentalities operating after the curling operation for restoring said band to position within said pocket.

6. In a machine for forming metal bands, the combination of a forming mandrel, a pocketed turret, means for transferring an annular metal band from said forming mandrel into a pocket of said turret, means for advancing said turret and said metal band carried thereby to a station, curling mechanism including a movable die and a stationary die located at said station for bending and curling the edges of said metal band, and instrumentalities carried in said movable die for removing the band from said dies after curling.

7. In a machine for forming metal bands, the combination of a forming mandrel, a pocketed turret, means for transferring an annular metal band from said forming mandrel into a pocket of said turret, means for advancing said turret and said metal band carried thereby to a station, curling mechanism including a movable die and a stationary die located at said station for bending and curling the edges of said metal band, and instrumentalities carried in said movable die and actuated by movement of the same for first engaging the curled band and stripping it from said stationary die and then disengaging the band and leaving it in said turret pocket for subsequent discharge.

8. In a machine for forming metal bands, the combination of means for simultaneously bending the opposite edges of a blank strip in the direction of curls, subsequently acting mechanism for permanently joining the ends of said band strip together to form a collar band, means for feeding the strip from the edge-bending means to said joining mechanism, means simultaneously acting to complete the bending of the two edges of said band into curls substantially circular in cross section, means for feeding said band from said fixing mechanism to said curling means, and power mechanism for cooperating said elements.

9. In a machine for forming metal bands, the combination of means for simultaneously bending the opposite edges of a blank strip in the direction of curls, subsequently acting mechanism for permanently joining the ends of said band strip together in an interfolded lock seam to form a collar band, and means simultaneously acting to complete the bending of the two edges of said band into curls substantially circular in cross section, and feeding devices and power mechanism for cooperating said elements in timed relation.

10. In a machine for forming metal bands the combination of a holder for a stack of sheet metal blanks for said bands, means for successively drawing away from said stack the foremost ends of said blanks, devices for successively drawing said blanks edgewise from said stack, feed rolls for propelling the blanks and means for bending the longitudinal edges of the blanks, a forming mandrel and means for placing the blanks successively thereon, means for feeding the blanks along the mandrel, means for forming hooks on the ends of the blanks, means for interlocking the hooks of the blanks, whereby the two ends of the blank are kept in line for curling, a turret having pockets to receive said blanks, devices for intermittently turning said turret to bring said pockets successively into line with the mandrel, means for moving the bands from the mandrel successively into successive pockets of the turret, die members for curling the edges of the blanks while held in said pockets, and power mechanism for cooperating said elements in timed relation.

JOHN F. PETERS.